US012734089B2

(12) United States Patent
Söder et al.

(10) Patent No.: US 12,734,089 B2
(45) Date of Patent: Sep. 15, 2026

(54) PATIENT TRANSFER DEVICE WITH A PROXIMITY SENSOR

(71) Applicant: Njord International AB, Gothenburg (SE)

(72) Inventors: Agnes Söder, Gothenburg (SE); Jacob Ahrnstein, Gothenburg (SE); Barbro Cagner, Alingsås (SE); Lisen Vinsa, Linköping (SE)

(73) Assignee: Njord International AB, Gothenburg (SE)

( * ) Notice: Subject to any disclaimer, the term of this patent is extended or adjusted under 35 U.S.C. 154(b) by 0 days.

(21) Appl. No.: 19/120,773

(22) PCT Filed: Jun. 2, 2023

(86) PCT No.: PCT/EP2023/064806
§ 371 (c)(1),
(2) Date: Apr. 13, 2025

(87) PCT Pub. No.: WO2024/078750
PCT Pub. Date: Apr. 18, 2024

(65) Prior Publication Data

US 2026/0000559 A1 Jan. 1, 2026

(30) Foreign Application Priority Data

Oct. 12, 2022 (SE) .................................... 2251193-5

(51) Int. Cl.
*A61G 7/10* (2006.01)

(52) U.S. Cl.
CPC ......... *A61G 7/1026* (2013.01); *A61G 7/1057* (2013.01); *A61G 7/1065* (2013.01); *A61G 7/1046* (2013.01)

(58) Field of Classification Search
CPC .. A61G 7/1026; A61G 7/1057; A61G 7/1065; A61G 7/1046; A61G 7/1078; A61G 7/1063; A61G 7/1025
See application file for complete search history.

(56) References Cited

U.S. PATENT DOCUMENTS 4,529,240 A * 7/1985 Engel ..................... A22B 7/006 452/187
4,930,193 A * 6/1990 Baker ..................... F16G 11/14 24/130

(Continued)

FOREIGN PATENT DOCUMENTS

WO 2022211710 10/2022

OTHER PUBLICATIONS

Kristina Jern, Search Report in SE Patent Application 2251193-5, 2 pages, Mar. 24, 2023, PRV: The Swedish Intellectual Property Office, Stockholm, Sweden.

(Continued)

*Primary Examiner* — Matthew Troutman
*Assistant Examiner* — Alison N Labarge
(74) *Attorney, Agent, or Firm* — Silver Legal LLC; Jarrett L. Silver

(57) ABSTRACT

A patient transfer device for moving a patient from a first surface to a receiving surface includes a retractable pulling wire, a motorized pulling arrangement, and a holder arrangement for holding a sheet or mattress. The holder arrangement has a holder element attached to a first end of the pulling wire. The pulling arrangement retracts the wire, moving the holder arrangement and holder element holding a sheet or mattress towards the pulling arrangement, thereby transferring the patient. A proximity sensor detects if the holder element reaches an end position near the pulling arrangement.

23 Claims, 19 Drawing Sheets

(56) References Cited

U.S. PATENT DOCUMENTS

| | | | | |
|---|---|---|---|---|
| 5,333,333 | A | 8/1994 | Mah | |
| 5,339,498 | A | 8/1994 | Parsons | |
| 6,341,393 | B1 * | 1/2002 | Votel | A61G 7/1034<br>5/81.1 HS |
| 6,496,991 | B1 * | 12/2002 | Votel | A61G 7/1046<br>5/81.1 R |
| 6,728,979 | B1 * | 5/2004 | Robert | A61G 7/1044<br>5/81.1 R |
| 7,802,328 | B2 * | 9/2010 | Lingegard | A61G 7/1078<br>5/89.1 |
| 11,879,521 | B2 * | 1/2024 | Carney | F16G 11/101 |
| 2014/0352058 | A1 * | 12/2014 | Sverdlik | A61G 7/1044<br>5/81.1 HS |
| 2020/0253801 | A1 * | 8/2020 | Kaikenger | G16H 40/63 |

OTHER PUBLICATIONS

Rudolf Schiffman, International Search Report and Written Opinion in PCT/EP2023/064806, ISA/EP (European Patent Office), Sep. 6, 2023.

Voula Tsogka, International Preliminary Report on Patentability, in PCT/EP2023/064806, ISA/EP (European Patent Office), Apr. 9, 2024.

Ingvar Friberg, Response to Written Opinion and Filing Demand (with claim amendments) in PCT/EP2023/064806, filed in WIPO, ISA/EP, Sep. 14, 2023, from Zacco Law Offices, Stockholm, Sweden.

* cited by examiner

PATIENT TRANSFER DEVICE WITH A PROXIMITY SENSOR

RELATED APPLICATIONS

This application is a 371 national stage of International Application No. PCT/EP2023/064806 filed on Jun. 2, 2023, which claims priority to Swedish Patent Application No. 2251193-5 filed on Oct. 12, 2022. These applications are incorporated by reference in their entirety.

TECHNICAL FIELD

The present disclosure relates to a patient transfer device for transferring a patient placed on a sheet or a mattress from a first surface to a receiving surface, such as from one bed to an adjoining bed or an operating table.

BACKGROUND

In hospitals, care facilities, and other settings, certain situations require that patients are transported from one surface to an adjoining surface, such as from one bed to an adjoining bed or to an operating table. This maneuver may either be done manually, requiring the cooperation of several nurses or other professionals, or by means of a patient transfer device. Patient transfer devices configured to move a patient from one surface to another are generally known.

Specifically, a patient transfer device for transferring a patient placed on a movable sheet on a first hospital bed to a second, receiving hospital bed is known from US2006090258. This patient transfer device comprises a base, a motor attached to the base, two straps connected to the motor such that these are retractable by means of the motor, and a clamping assembly releasably attachable to a sheet. Thus, the patient transfer device may be arranged on one side of a receiving hospital bed, opposite the first hospital bed, and connected to a sheet on which a patient lies. The clamping assembly may then be used in connection with the motor and the two straps to pull a sheet on which a patient lies from the first bed to the second, receiving bed.

WO9613239 discloses a patient transport system for transporting a patient from a bed to a stretcher or vice versa, using a bed sheet and a conveyor attached to the bed or the stretcher. The sheet is removably attached to the conveyor by a clip arrangement, where a flexible belt attaches the clip to the conveyor. The conveyor is operated manually by the use of a handle.

However, the use of many of these devices often involve labor intensive, time consuming and/or ergonomically challenging steps. There is therefore a need for improved patient transfer devices.

SUMMARY

The disclosure concerns a patient transfer device for transferring a patient placed on a sheet or a mattress from a first surface to a receiving surface, wherein the patient transfer device comprises: at least one retractable pulling wire; a pulling arrangement comprising a motor operatively connected to the pulling wire so as to allow retraction of the pulling wire by means of the motor; and a holder arrangement for holding the sheet or the mattress when moving the sheet or the mattress and thereby transferring the patient placed on the sheet or the mattress.

The holder arrangement comprises a holder element to which a first end of the pulling wire is attached, and the pulling arrangement is configured to retract the pulling wire and thus move the holder arrangement and the holder element towards the pulling arrangement so as to, when the holder arrangement is arranged to hold the sheet or the mattress, move the sheet or the mattress towards the pulling arrangement and thereby transfer the patient placed on the sheet or the mattress from the first surface to the receiving surface.

Further, the pulling arrangement is provided with a proximity sensor configured to detect whether the holder element has reached an end position at or close to the pulling arrangement.

A signal from such a detector is useful for indicating that the patient transfer is completed and that the motor should be turned off to avoid damage to the patient transfer device when the pulling wire has been fully retracted. For instance, the motor may be damaged if it still is in operation and a part of the holder arrangement gets stuck at or in the pulling arrangement. The proximity sensor simplifies operation of the patient transfer device and reduces the risk for damage to the device. The sensor signal may be used to generate an alarm signal to call a user's attention to the situation and/or to generate a control signal that stops operation of the motor.

The proximity sensor may be based on various non-touch techniques where changes or presence of an electromagnetic field or electromagnetic radiation are sensed.

Typically, the patient transfer device comprises two laterally spaced apart pulling wires arranged in parallel where both pulling wires may be retracted by the same motor (e.g. via first and second bobbins, one for each wire). In such a case the patient transfer device may be provided with first and second proximity sensors, one for each wire/holder element. It may then be arranged so that it is sufficient that one of the proximity sensors detects that the corresponding holder element has reached the end position to generate the alarm and/or control signal.

In an embodiment, the patient transfer device is provided with a control circuitry configured to control operation of the motor in dependence of a sensor signal received from the proximity sensor, wherein the control circuitry is configured to stop operation of the motor when receiving a sensor signal that indicates that the holder element has reached the end position. The control circuitry may comprise a plurality of connected control units, sensors, etc. and is typically configured to control also other parts of the patient transfer device as well as to handle control signals generated by a user.

In an embodiment, the proximity sensor is configured to sense presence or changes in an electromagnetic field or a beam of electromagnetic radiation. The holder element may e.g. be provided with a magnet or a piece of iron that can be detected when coming close to the sensor. Or the change in backscattering from a light source can be used to detect the holder element when located close to the sensor.

In an embodiment, the proximity sensor is configured to sense presence or changes in a magnetic field, such as a Hall effect sensor, and wherein the holder element is provided with a magnet.

In an embodiment, the holder arrangement comprises a stop arrangement configured to hold the first end of the pulling wire in place with respect to the holder element, and wherein the holder element encapsulates the stop arrangement. The stop arrangement may, for instance, be a ferrule clamped to the pulling wire. To prevent that the holder element gets stuck in the sheet or other part when it moves over the surface during retraction of the pulling wire it is an advantage if the holder element has a rounded shape, a smooth surface and that there are no parts protruding therefrom, such as the stop arrangement. Therefore, it is an advantage that the stop arrangement is arranged inside the holder element, i.e. that the holder element encapsulates the stop arrangement. The encapsulation also protects the stop arrangement from dirt and therefore makes the holder arrangement easy to clean.

In an embodiment, the holder element is provided with first, second and third apertures, and wherein the stop arrangement is arranged inside the holder element at the first aperture.

In an embodiment, the pulling wire extends out from the holder element via the first aperture and back into the holder element via the second aperture so as to form a loop outside of the holder element between the first and second apertures. This wire loop may be used for connection to a knob or similar for holding the sheet or mattress. The wire loop may thus form part of the holder arrangement (together with the holder element and other parts).

In an embodiment, the pulling wire extends out from the holder element via the third aperture and further towards the pulling arrangement.

In an embodiment, the pulling wire is free to move in relation to the holder element between the second and third apertures so that the loop of the wire is tightened or decreased when pulling the pulling wire out from the third aperture and so that the loop of the pulling wire is loosened or increased when pulling the pulling wire out from the second aperture.

In an embodiment, the holder element comprises a first and a second portion, wherein the first and second apertures are arranged in the first portion, wherein the third aperture is arranged in the second portion, and wherein the first portion is arranged to interconnect with the second portion so that the first and/or the second portion encapsulate the stop arrangement when connected. The use of two (or more) portions allows for arranging the pulling wire and the stop arrangement properly in the holder element before interconnecting the portions.

In an embodiment, the first and second portions of the holder element are arranged so that a part of one of the portions is inserted into the other portion when the first and second portions are pushed together and connected so as to form the holder element, and wherein the first and second portions are provided with a pair of complementary and circumferentially extending snap-lock members that engage when the first and second portions are pushed together and connected. For instance, a part of the second portion to be inserted into the first portion may be provided with an outer flange and a part of the first portion intended to receive the part of the second portion may be provided with an inner complementary groove adapted to receive the flange when the two portions are pressed together.

In an embodiment, the complementary and circumferentially extending snap-lock members comprises a flange and a groove, wherein the flange has an inclined side directed so as to facilitate passage of the snap-lock members when pushing the first and second portions together, and wherein the flange has a straight side directed in the opposite direction so as to prevent unintentional passage of the snap-lock members when the first and second portions have been pushed together and connected.

In an embodiment, the stop arrangement comprises a knot formed by the pulling wire and/or a stop member attached to the pulling wire.

In an embodiment, the stop arrangement comprises a ferrule arranged around the pulling wire, wherein the ferrule is clamped onto the pulling wire so as to be firmly attached thereto, and wherein the ferrule, at least over a part of its length, has a diameter that is larger than that of the first aperture. The ferrule, and the end of the wire, is thus secured inside the holder element. To provide for a secure clamping of the ferrule, the pulling wire may be bent 180° close to its end so that the ferrule is arranged and clamped around a "double" wire.

In an embodiment, the holder element is provided with a wire guiding channel through which the pulling wire runs, wherein the wire guiding channel extends between the second and third apertures, and wherein a part of the wire guiding channel is formed by a guiding tube that is connected to the first portion and extends towards the second portion. The wire guiding channel eliminates or reduces the risk that the pulling wire gets stuck inside the holder element.

In an embodiment, the holder element comprises a magnet. This makes it possible to use e.g. a Hall effect sensor as proximity sensor.

In an embodiment, the magnet is provided with a through hole through which the pulling wire runs. The magnet is preferably arranged inside the holder element so that the through hole forms part of the wire guiding channel. Using such a magnet and arranging the wire in such a way means the magnet surrounds the pulling wire, which in turn means that even if the pulling wire and the holder element is rotated (along the longitudinal direction of the wire), some part of the magnet will always be positioned on a side facing the proximity sensor when the holder element reaches the sensor during retraction of the wire. In turn this ensures that the magnet will not be located too far from the sensor, which may lead to a too weak sensor signal.

In an embodiment, the magnet is arranged at an inside of the second portion facing the first portion of the holder element, wherein the guiding tube is adapted to hold the magnet in place when the first and second portions are interconnected. The magnet may be placed in a recess adapted to receive the magnet. The wire guiding tube then holds the magnet in place when the two portions of the holder element are connected. In this case the wire guiding tube has dual purposes: to guide the wire and to hold the magnet in place.

In an embodiment, the holder element is made of a polymer material, such as a plastic or rubber material.

In an embodiment, the pulling arrangement comprises a wire bobbin connected to the motor and wherein the proximity sensor is arranged in connection to the wire bobbin. The pulling wire may be made of polymer material.

In an embodiment, the proximity sensor protrudes through a hole in a casing of the pulling arrangement so as to be positioned at least partly above an upper surface of the casing. This way the sensor can come in close contact with the holder element when the wire is pulled in and the holder element approaches the sensor.

In an embodiment, a component, such as a wire guide and/or a receiver for the holder element, is arranged on top of and around the proximity sensor, wherein the component on its lower side is provided with a recess configured to give room for and house the protruding part of the proximity sensor. This component protects the sensor and may be attached to casing at the upper surface thereof. The component may also hold the element in place at its end position.

The wire loop may be connected to a mattress member or a sheet member. The mattress member may e.g. comprise a mattress holder provided with an opening, where the mattress holder is attached to the mattress. The mattress member may further comprise a shackle member, such as carabineer, which is attached in a releasable manner to the opening. In that case, the wire loop of the holder arrangement may be connectable to the carabineer, i.e., the carabineer may be threaded through the loop. The holder arrangement is thus suitable for holding the mattress via the mattress member.

The sheet member may e.g. comprise a rod with one or more knobs. In that case, the loop of the holder arrangement may be connectable to a knob with the sheet arranged between the knob and the loop. The holder arrangement is thus suitable for holding the sheet via the sheet member.

The holder arrangement enables a quick and reliable attachment of a sheet or mattress. When the holder arrangement is connected to a knob to hold the sheet in place between the knob and the holder arrangement, a patient laying on the sheet on a bed can be transferred from a first surface of the bed to a receiving surface by the use of a pulling arrangement. Similarly, when the holder arrangement is connected to a mattress member that is attached to the mattress, a patient laying on said mattress can be transferred from a first surface of the bed to a receiving surface by the use of a pulling arrangement. The receiving surface may be another bed, or may e.g. be a resting surface in an X-ray or computerized tomography (CT) machine, or in a preparation room for magnetic resonance imaging (MRI).

The holder arrangement is easily attached to the knob with the sheet in between when the patient is positioned beside the receiving surface and will hold the sheet in a secure manner during the transfer of the patient. When the patient has been transferred, the holder arrangement can easily be detached from the knob and the sheet.

Similarly, the holder arrangement is easily attached to the mattress member when the patient is positioned beside the receiving surface and will hold the mattress in a secure manner during the transfer of the patient. When the patient has been transferred, the holder arrangement can easily be detached from the mattress member.

The holder arrangement of this disclosure is useful also in case the patient holder device is not provided with any proximity sensor.

The size of the loop of the holder arrangement is reconfigurable, which provides flexibility since the holder arrangement may be used for differently sized sheet members or mattress members without modification. For example, the sheet will most likely not be folded evenly over the knob when it is attached to the holder arrangement. The holder arrangement may therefore advantageously be used to hold sheets of different materials and thicknesses, which may fold differently and thereby provide different effective diameters of the combination of knob and sheet. Furthermore, the shape of the contact surface between the loop and the knob preferably correspond to each other to provide a form-fit, which enlarges the contact surface for the sheet. The larger contact surface reduces wear and stress on the sheet, and prevents the holder arrangement from slipping or tearing the sheet.

The disclosed holder arrangement comprises few parts that are easy to manufacture and easy to clean.

According to some aspects, as depicted in FIG. 5B, the stop arrangement comprises a knot 7B formed by the pulling wire. The knot 7B may e.g. be arranged such that it cannot pass through the first aperture. The knot thereby securely holds the first end of pulling wire in place with respect to the first aperture. The knot 7B does not require any additional components/material, which is an advantage. Alternatively, or in combination of, the stop arrangement may comprise a stop member arranged attached to the pulling wire. Such stop member may e.g. be a clamp that is deformed to be attached to the pulling wire. Furthermore, the stop arrangement may be integrated in the first portion. For example, the first aperture may comprise teeth arranged such that the pulling wire can be pulled through in only a first direction. The teeth locks the pulling wire in place when the pulling wire is pulled in a direction opposite to the first direction.

According to some aspects, the holder element has a rounded shape. This way, less dirt can be accumulated on the holder element. For example, the first and the second portions may have respective frustoconical shapes extending in the extension direction of the pulling wire from the third aperture. In addition, the holder element preferably has rounded shape that provides low friction when the holder element slides across a surface. The rounded shape further reduces deterioration of surfaces the holder element slides across, such as surrounding mattresses, sheets, and plastic material.

According to some aspects, the first portion is provided with a front surface, wherein the first and the second apertures are arranged on the front surface. The first surface may be provided with a protrusion arranged between the first and the second apertures and arranged extending from the first surface. The protrusion is configured to provide a gap between the pulling wire and the front surface when the loop is in a smallest possible configuration, i.e., when the second end of the pulling wire is pulled away from holder arrangement when the holder arrangement is not engaging the knob or shackle member. The protrusion facilitates grabbing the pulling wire when the holder arrangement is not engaging a sheet member or mattress member, and thereby facilitates using the holder arrangement.

According to some aspects, the pulling arrangement comprises a receiver member configured to receive the holder element, wherein the receiver member has a complementary shape to the holder element. This provides an arrangement in which the holder element can be received when it has been maximally pulled towards the patient transferring device. In particular, the receiver member may be arranged in connection to a wire bobbin connected to the second end of the pulling wire.

According to some aspects, the patient transfer device is mounted on a frame provided with wheels. This way, the patient transfer device can easily be moved around and be repositioned.

According to some aspects, the sheet pulling arrangement is mounted on the frame in a height adjustable manner. This way, the patient transfer device can be adapted to different heights.

According to some aspects, the patient transfer device is mounted on an adjustable wall mounted arm.

There is also disclosed herein a system comprising the patient transfer device according to the discussions above and the mattress member arranged attachable to the mattress and/or the sheet member.

According to some aspects, the mattress member is provided with an opening and a shackle member, wherein the shackle member is releasably attached to the opening and the holder arrangement is connectable to the shackle member.

According to some aspects, the sheet member is provided with at least one knob, wherein the holder arrangement is connectable to the sheet member so as to hold the sheet in place between the knob and holder arrangement when connected. Such sheet member enables a secure attachment to the sheet. Thus, a patient arranged on the sheet can be transferred securely.

According to some aspects, the sheet member is an elongated member extending in an longitudinal direction, wherein the sheet member comprises two knobs arranged at a distance from each other in the longitudinal direction, and wherein the knobs are arranged extending in the longitudinal direction. This provides a sheet member that is easy to manufacture and that facilitates pulling the sheet in a straight manner.

According to some aspects, the knob comprises a head and a stem, wherein the stem has a circular cross section and wherein the head is larger than the stem. According to some further aspects, the stem comprises a circumferentially extending rounded groove. This enables a quick and secure attachment of the attachment means to the knob.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the present disclosure cited as examples. In the drawings.

DETAILED DESCRIPTION

Figure 1:
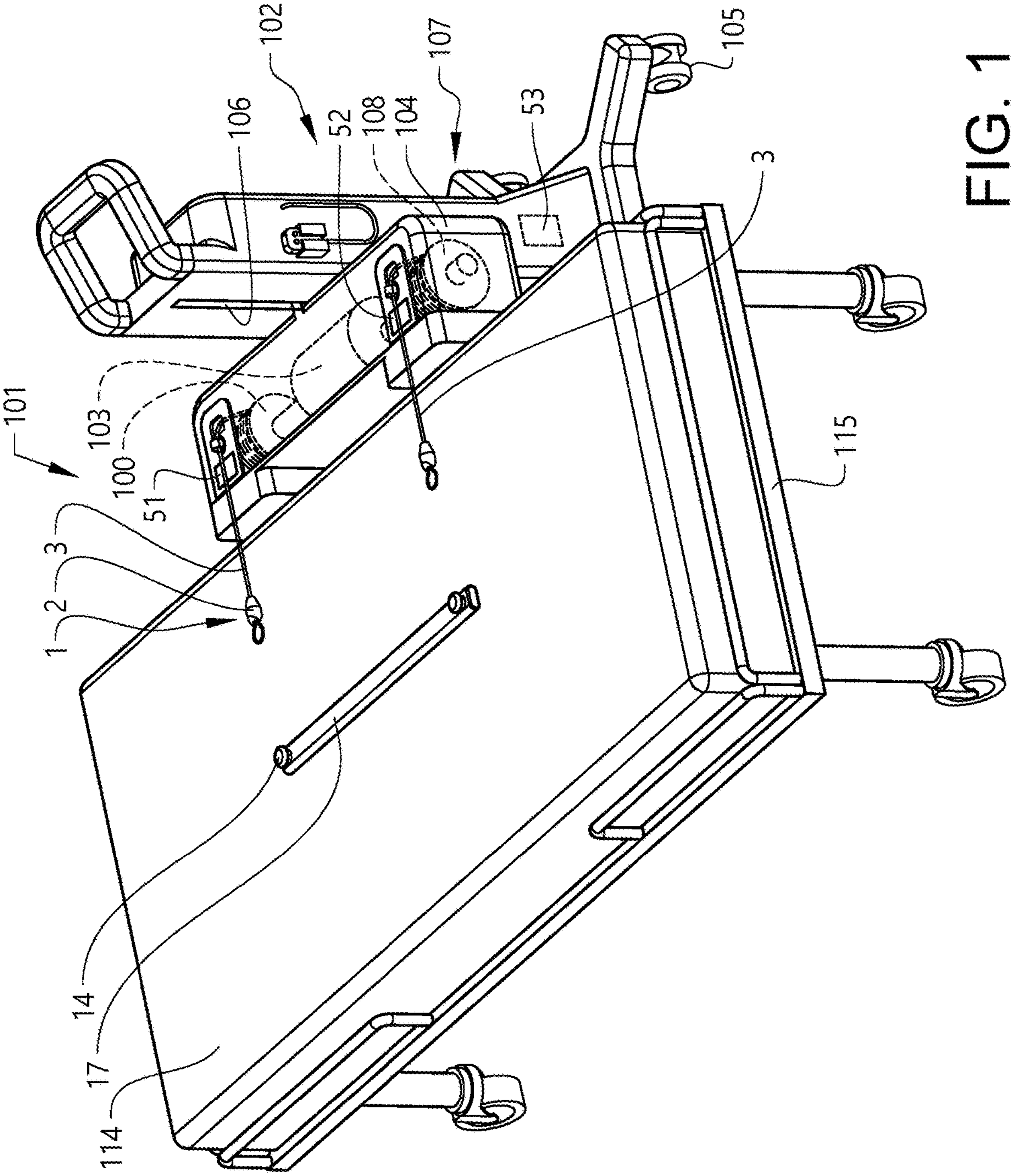
FIG. 1 shows a patient transfer device.

The present disclosure will now be described more fully hereinafter with reference to the accompanying drawings, in which certain aspects of the present disclosure are shown. The present disclosure may, however, be embodied in many different forms and should not be construed as limited to the embodiments and aspects set forth herein; rather, these embodiments are provided by way of example so that this disclosure will be thorough and complete, and will fully convey the scope of the present disclosure to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

The patient transfer device 101 shown in FIG. 1 comprises in the shown example a holder arrangement 1, a pulling arrangement 107 and a frame 102, onto which the pulling arrangement 107 is attached. The frame 102 is arranged to be placed on a horizontal surface, such as a floor, and is provided with wheels 105 for moving the patient transfer device 101 across this surface. The pulling arrangement 107 comprises a motor 103 connected to two wire bobbins 108 and an outer casing 104 that covers and protects the motor 103 and the wire bobbins 108 from contamination caused by for example contact with dust or bodily fluids from a patient that is transferred using this patient transfer device 101. The outer casing may be removed completely or may be attached with hinges, such that the outer casing can be opened when the wire bobbins are to be cleaned or replaced. The casing may be provided with pads attached to the outer casing in a removable manner, such that they may be removed from the outer casing.

The shown patient transfer device 101 comprises means for vertically adjusting the position of the pulling arrangement 107. This may for example be an electrical motor (not shown) arranged in the frame 102 that can move the pulling arrangement 107 along a vertical track 106 or groove in the frame 102.

Figure 3:
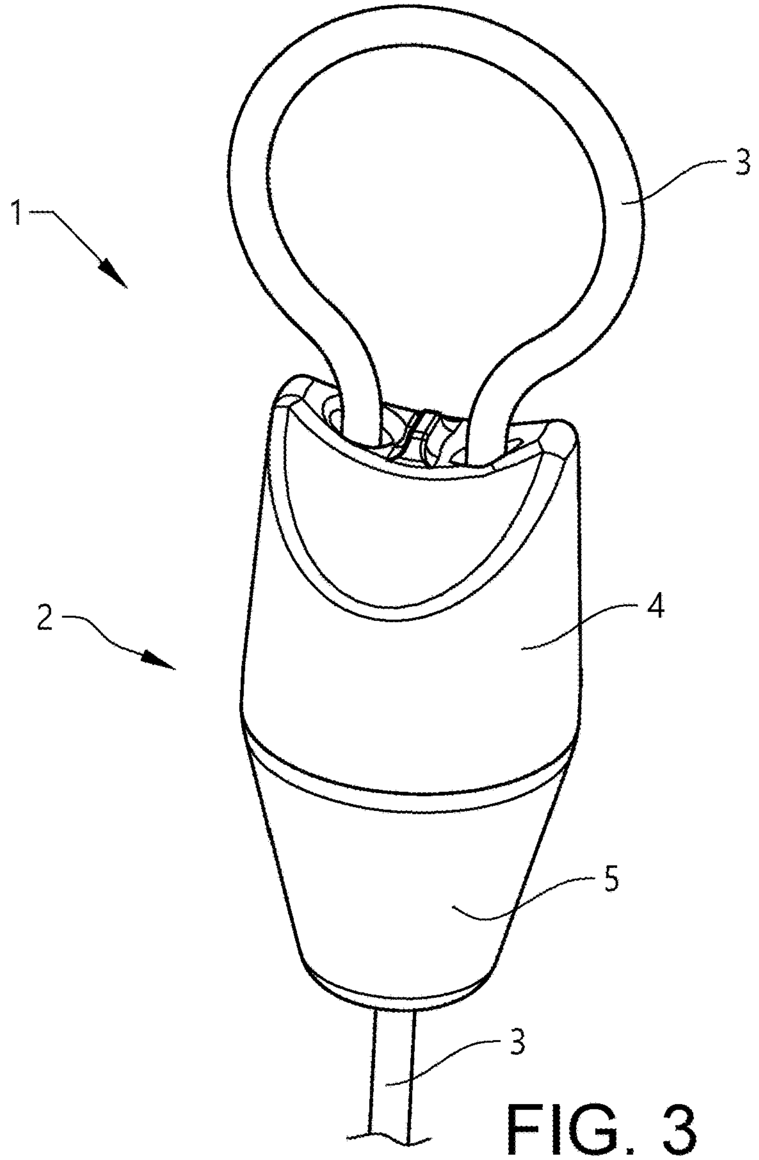
FIG. 3 shows a holder arrangement.
Figure 5B:
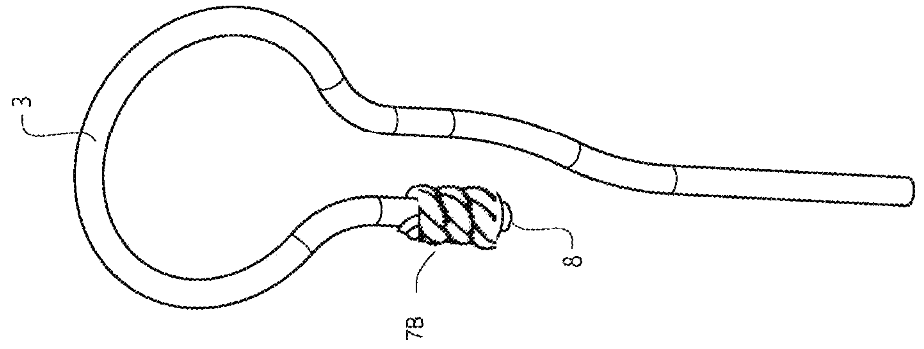
FIG. 5 shows a part of a pulling wire and FIG. 5B shows another embodiment of a part of a pulling wire.
Figure 5:
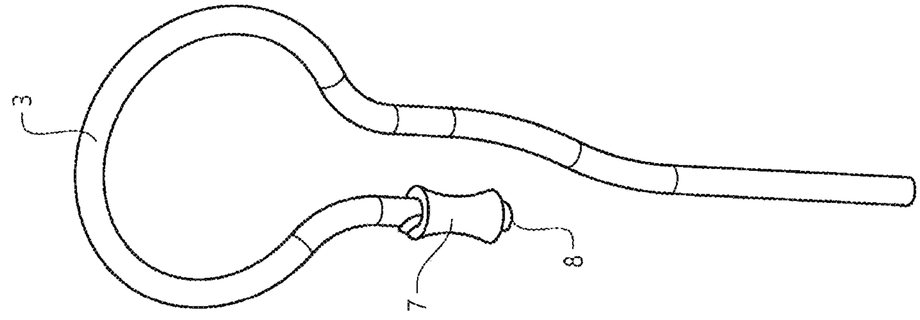
Figure 4:
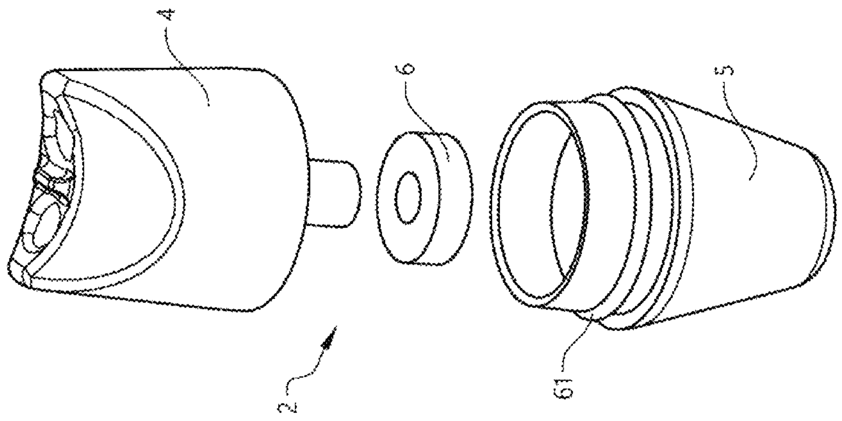
FIG. 4 shows parts of a holder element used in a holder arrangement.

The motor 103 is coupled to two laterally spaced apart wire bobbins 108 that are used when pulling a patient from a first surface to a receiving surface. First and second laterally spaced-apart pulling wires 3 wound up on the corresponding wire bobbin 108 when retracting the pulling wires 3, which is done by operating the motor 103 and rotating the bobbins 108. Each bobbin 108 is mechanically connected to the motor 103, either directly to the motor or to a shaft driven by the motor. A holder element 2 (shown in more detail in FIG. 3) is arranged in connection to a first end 8 of each of the two wires 3. The holder arrangements are adapted to be releasably attached, by means of a loop of the pulling wire 3, to a corresponding knob 14 arranged on a sheet member 17, which in this example is an elongated connecting member. In other words, the sheet member may be provided with at least one knob, and the holder arrangement is connectable to the sheet member so as to hold the sheet in place between the knob and holder arrangement when connected. The holder arrangements are also adapted to be releasably attached to a mattress member that is attached to a movable mattress. The mattress member is disused in more detail further below.

Figure 10A:
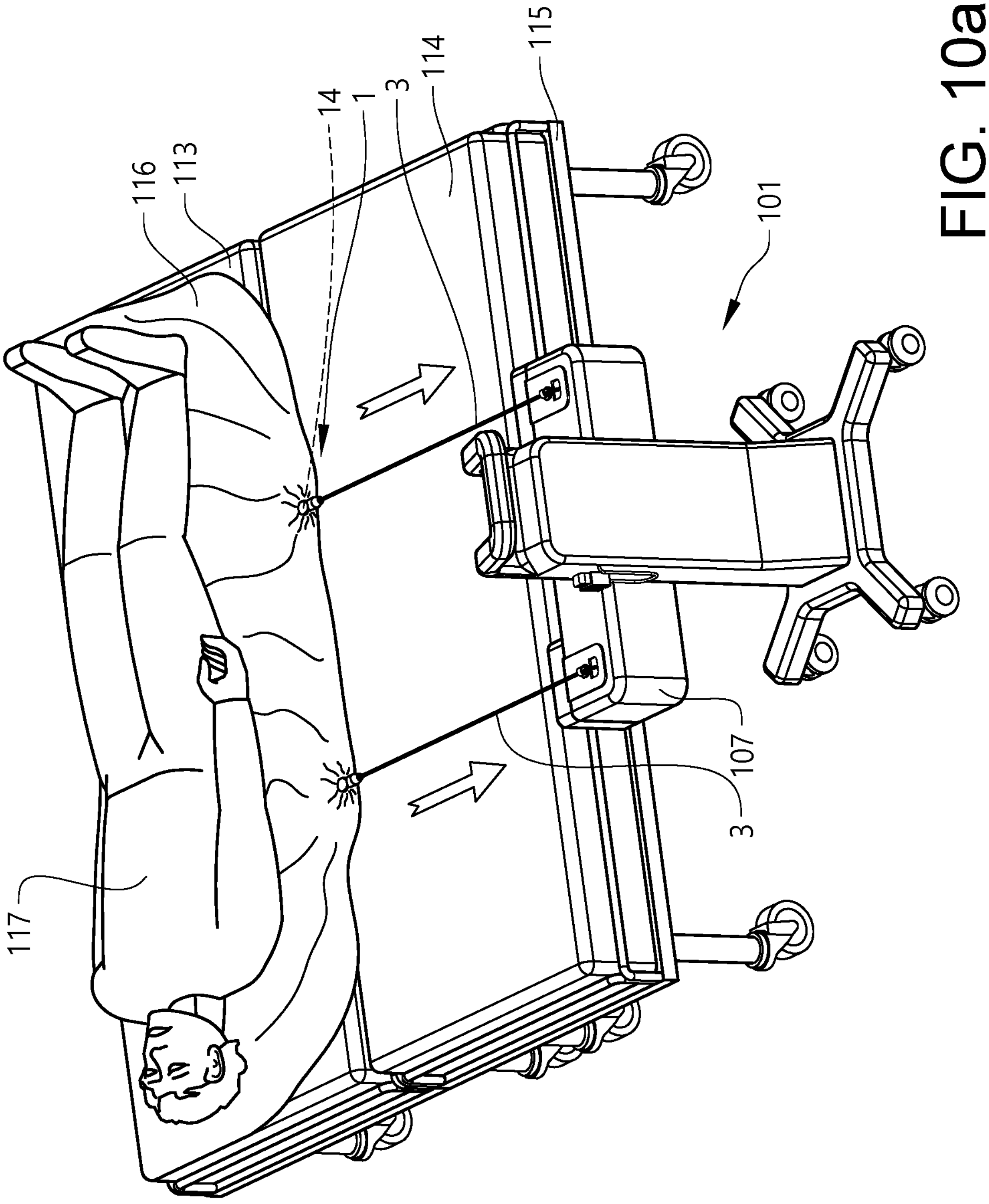
FIGS. 10*a* and 10*b* show the patient transfer device of FIG. 1 when used to transfer a patient from a first surface to a receiving surface.
Figure 10B:
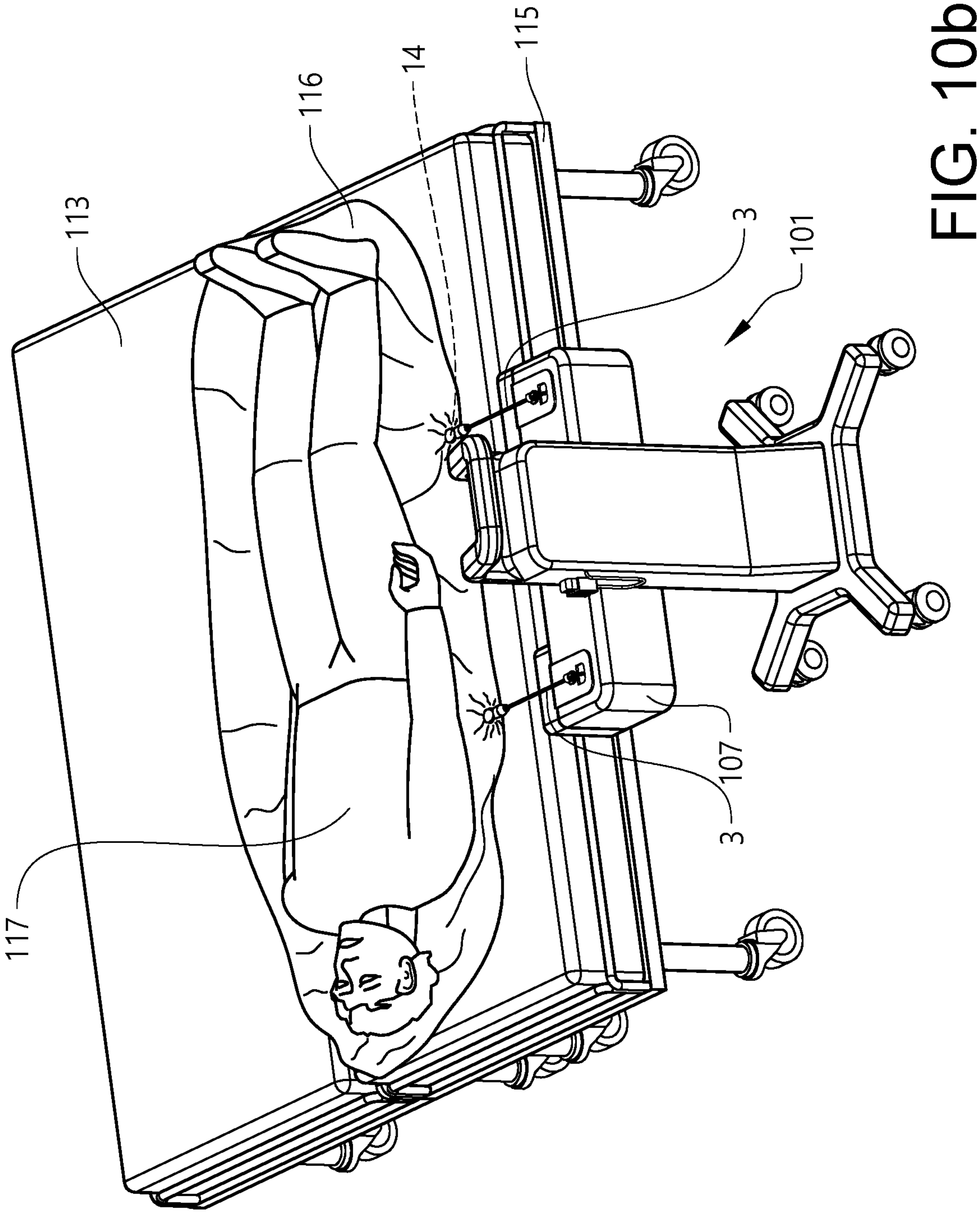

FIGS. 10*a*-10*b* show perspective views illustrating the use of the patient transfer device 101 in transferring a patient 117 from a first surface 113, in the illustrated case from a first bed, to a receiving surface 114, in the illustrated case to a receiving bed 115. In FIG. 10*a*, the patient 117 is lying on a sheet 116 on the first bed, and the holder arrangement 1 of the patient transfer device 101 is connected thereto. The receiving bed 115 is arranged side-by-side with the first bed, and the patient transfer device 101 is arranged on the opposite side of the receiving bed than the first bed. In FIG. 10*b*, the motor 103 of the patient transfer device 101 causes the retraction of the holder element 2 towards the patient transfer device 101 and the receiving bed 115. This causes a pulling force on the sheet 116 on which the patient 117 lies. Thus, the patient 117 is transferred from a first surface 113 to a receiving surface 114.

Figure 12:
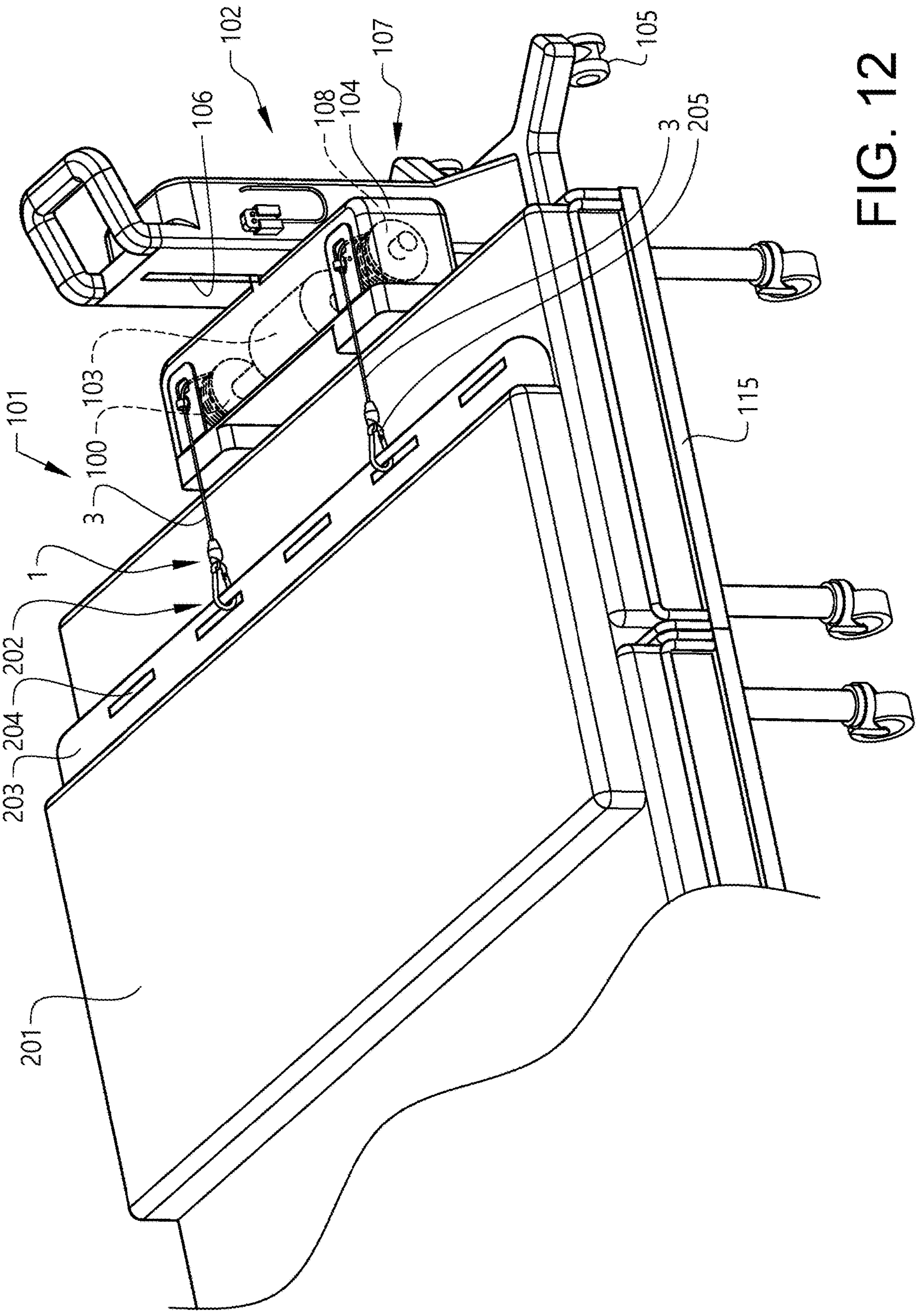
FIG. 12 shows another patient transfer device.

FIG. 12 shows the patient transfer device according to FIG. 1 where sheet member 17 has been replaced by a mattress member 202. The mattress member 202 is attached a movable mattress 201. The movable mattress may e.g. be a foam mattress. In FIG. 12, the mattress member comprises a mattress holder 203 and two shackle members 205. The mattress holder is provided with five openings 204. In general, however, the mattress member may be provided with any number of openings and shackle members. In particular, respective carabineers constitute the shackle members in FIG. 12. A carabineer is a type of shackle, and comprises a loop with a spring-loaded gate. The loop of the carabineer normally comprises metal. Two holder arrangements are releasably attached to respective carabineers. The carabineers are releasably attached to respective openings in the matrass holder 203. The mattress holder may comprise a fabric. Such fabric may be sewn to the movable mattress. The mattress holder may alternatively comprise a stiffer material, such as plastic. The mattress holder may also be attached to the movable mattress by other means, such as by adhesives, screws etc.

In FIG. 12, the patient transfer device 101 is transferring the movable mattress 201 from a first surface of a first bed to a receiving surface of a receiving bed 115. The receiving bed 115 is arranged side-by-side with the first bed, and the patient transfer device 101 is arranged on the opposite side of the receiving bed than the first bed. The motor 103 of the patient transfer device 101 casus the retraction of the holder elements 2 towards the patient transfer device 101 and the receiving bed 115. This causes a pulling force on the movable mattress 201 on which the patient can lie. Thus, the patient can be transferred from a first surface to a receiving surface.

The openings 204 of the mattress holder 203 are arranged in a spaced apart manner. In the shown example of FIG. 12, two openings are spaced apart with a distance corresponding to the distance between the wire bobbins of the pulling arrangement 107. This will allow the pulling arrangement 107 to pull the holder arrangement in a straight manner. The mattress holder 203 allows the load from pulling a mattress on which a patient lies to be distributed to both wires 3. The patient transfer device is preferably arranged such that pulling forces acting on the mattress are parallel to the pulling wires 3 of the pulling arrangement. There will thus not be any misalignment of the holder arrangement during transfer of a patient.

The sheet member 17 (shown in e.g. FIG. 1) may be a stiff rod or may be a flexible wire of some kind. In the shown examples, a rod is used as the sheet member. The knobs are mounted on the rod in a spaced apart manner, in the shown example with a distance corresponding to the distance between the wire bobbins of the pulling arrangement 107. This will allow the pulling arrangement 107 to pull the holder arrangement in a straight manner. A rod may be provided with more than two knobs, depending on e.g. the length of the rod or the size of a sheet. The rod allows the load from pulling a sheet on which a patient lies to be distributed to both wires 3. In the shown example, the rod is provided with two knobs arranged at the ends of the rod. A rod or a wire may also simplify the handling of the holder arrangement, e.g. by allowing both wires 3 to be unwound from the respective wire bobbins 108 at the same time. The sheet member will also ensure that the distance between the two knobs corresponds to the distance between the attachment points for the pulling wires of the pulling arrangement. The patient transfer device is preferably arranged such that pulling forces acting on the sheet will be parallel to the pulling wires 3 of the pulling arrangement. There will thus not be any misalignment of the holder arrangement during transfer of a patient.

Figure 11:
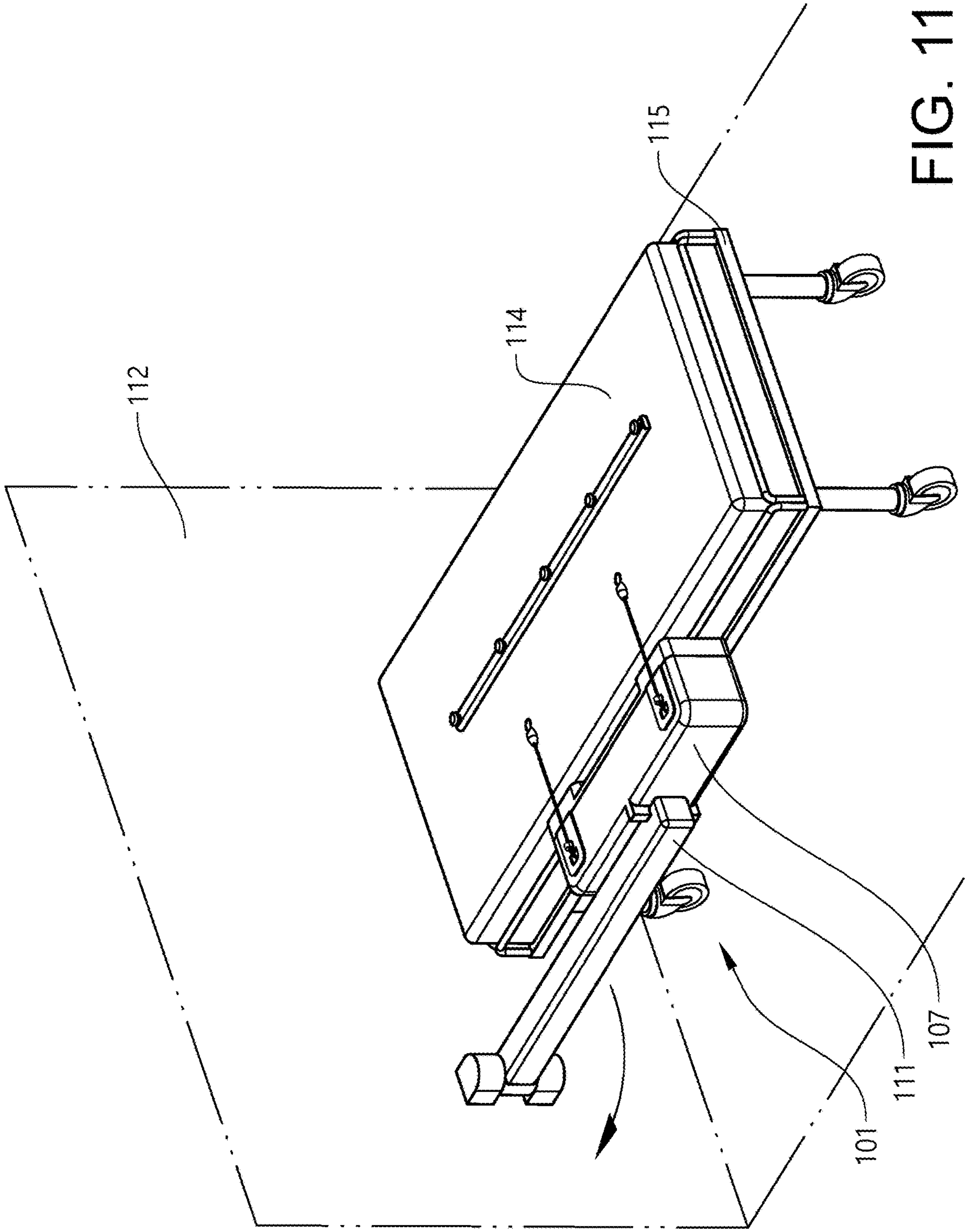
FIG. 11 shows a further example of a patient transfer device.

FIG. 11 shows a perspective view of a patient transfer device according to another aspect of the present disclosure. Here, the pulling arrangement 107 of the patient transfer device 101 is mounted on an adjustable movable arm 111 that is mounted to a wall 112. It should be understood that the movable arm 111 may alternatively extend from a ceiling mount instead of a wall mount, and that the number of joints on the arm may vary. In the shown example, the sheet member 17 is a longer rod compared to the previous examples and comprises five knobs 14. Two knobs are as described above arranged with a distance corresponding to the distance between the wire bobbins of the pulling arrangement 107. This will allow the pulling arrangement 107 to pull the holder element in a straight manner. One knob is arranged between the two knobs used for pulling the holding elements and two knobs are arranged at the outer ends of the rod. The use of more knobs may distribute the load on the sheet more evenly, which may be of advantage when heavier patients are to be transferred.

Figure 14A:
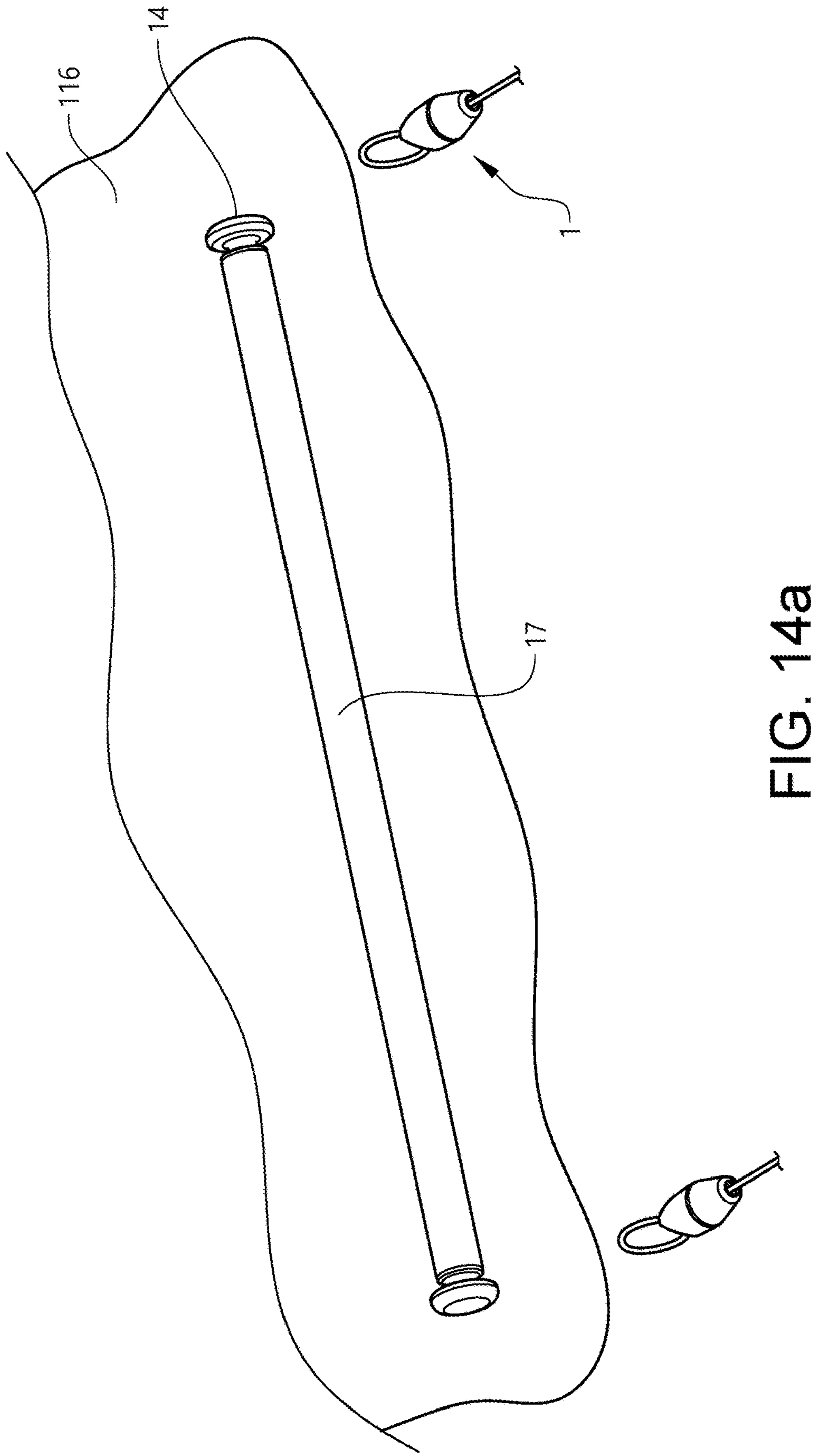
FIG. 14*a* shows a sheet member with knobs.

FIG. 14*a* shows another example of a sheet member 17. Here, the sheet member is an elongated member extending in an longitudinal direction, wherein the sheet member comprises two knobs arranged at a distance from each other in the longitudinal direction, and wherein the knobs are arranged extending in the longitudinal direction. This provides a sheet member that is easy to manufacture and that facilitates pulling the sheet in a straight manner.

The pulling wire is preferably a wire that is easy to clean and that does not interfere with other equipment in a hospital environment. Thus, the pulling wire preferably is made from a synthetic material such as polyester and/or dyneema.

As indicated in FIG. 1, the pulling arrangement 107 is provided with first and second proximity sensors 51, 52, one for each wire/holder element/bobbin, configured to detect whether the corresponding holder element 2 has reached an end position at the outer housing 104 close to the corresponding bobbin 108. In this example, the proximity sensor 51, 52 is a Hall effect sensor capable of sensing the presence of a magnet 6 arranged in the holder element 2. Exactly where to position the proximity sensors 51, 52 depends, for instance, on the specific design of the patient transfer device 101.

As further indicated in FIG. 1, the patient transfer device 101 is provided with a control circuitry 53 configured to control, for instance, operation of the motor 103 in dependence of a sensor signal received from the proximity sensor 51, 52. The control circuitry 53 is further configured to stop operation of the motor 103 when receiving a sensor signal that indicates that any of the holder elements 2 has reached the end position, i.e. that any of the holder elements 2 has assumed a position close to its corresponding proximity sensor 51, 52. This is a safeguard function to avoid that the pulling wires 3 are retracted too much so that e.g. the holder elements 2 get stuck, which could damage the motor 103. A user may manually stop operation of the motor 103 before any of the holder elements 2 reaches its end position.

FIGS. 3-8*b* show the structure of the holder element 2 and the arrangement of the pulling wire 3 at the holder element 2.

The holder arrangement 1 comprises a stop arrangement 7 configured to hold the first end 8 of the pulling wire 3 in place with respect to the holder element 2. The holder element 2 encapsulates the stop arrangement 7. The holder element 2 is provided with first, second and third apertures 9, 10, 12 and the stop arrangement 7 is arranged inside the holder element 2 at the first aperture 9. The pulling wire 3 extends out from the holder element 2 via the first aperture 9 and back into the holder element 2 via the second aperture 10 so as to form the wire loop outside of the holder element 2 between the first and second apertures 9, 10. The pulling wire 3 extends out from the holder element 2 via the third aperture 12 and further towards the pulling arrangement 107. The pulling wire 3 is free to move in relation to the holder element 2 between the second and third apertures 10, 12 so that the loop of the wire 3 can be tightened or decreased when pulling the pulling wire 3 out from the third aperture (12) and so that the loop of the pulling wire 3 can be loosened or increased when pulling the pulling wire 3 out from the second aperture 10.

The stop arrangement 7 comprises in this example a ferrule arranged around a bent/folded end part of the pulling wire 3, wherein the ferrule is clamped onto the pulling wire 3 so as to be firmly attached thereto. The ferrule has, at least at its end parts, a diameter that is larger than that of the first aperture 9 so that it is prevented from getting loose from the holder element 2.

To allow mounting of the wire 3 into the holder element 2, the holder element 2 comprises a first and a second connectable portions 4, 5. The first and second apertures 9, 10 are arranged in the first portion 4 and the third aperture 12 is arranged in the second portion 5. The two portions 4, 5 fully encapsulate the stop arrangement 7 when connected. The wire 3 can be arranged in the holder element 2 before connecting the two portions 4, 5.

The first and second portions 4, 5 of the holder element 2 are arranged so that a part of one of the portions, in this case the second portion 5, is inserted into the other portion, in this case the first portion 4, when the two portions are pushed together and connected so as to form the holder element 2. The first and second portions 4, 5 are provided with a pair of complementary and circumferentially extending snap-lock members 61, 62 that engage when the first and second portions 4, 5 are pushed together and connected. This could be arranged in other ways, for instance, the holder element 2 could instead be designed so that a part of the first portion 4 is to be inserted into the second portion 5.

As shown in FIGS. 4, 6, 7*a* and 8*b*, the complementary and circumferentially extending snap-lock members include in this case a flange 61 arranged onto the second portion 5 and a groove 62 arranged onto the first portion 4. The flange 61 has an inclined side directed towards the first portion 4 for facilitating passage of the snap-lock members 61, 62 when pushing the first and second portions 4, 5 together. Further, the flange 61 has a straight side directed in the opposite direction (away from the first portion 4) so as to prevent unintentional passage of the snap-lock members 61, 62 when the first and second portions 4, 5 have been pushed together and connected. All in all, this simplifies the procedure for connecting the two portions and provides for a secure connection.

Figure 6:
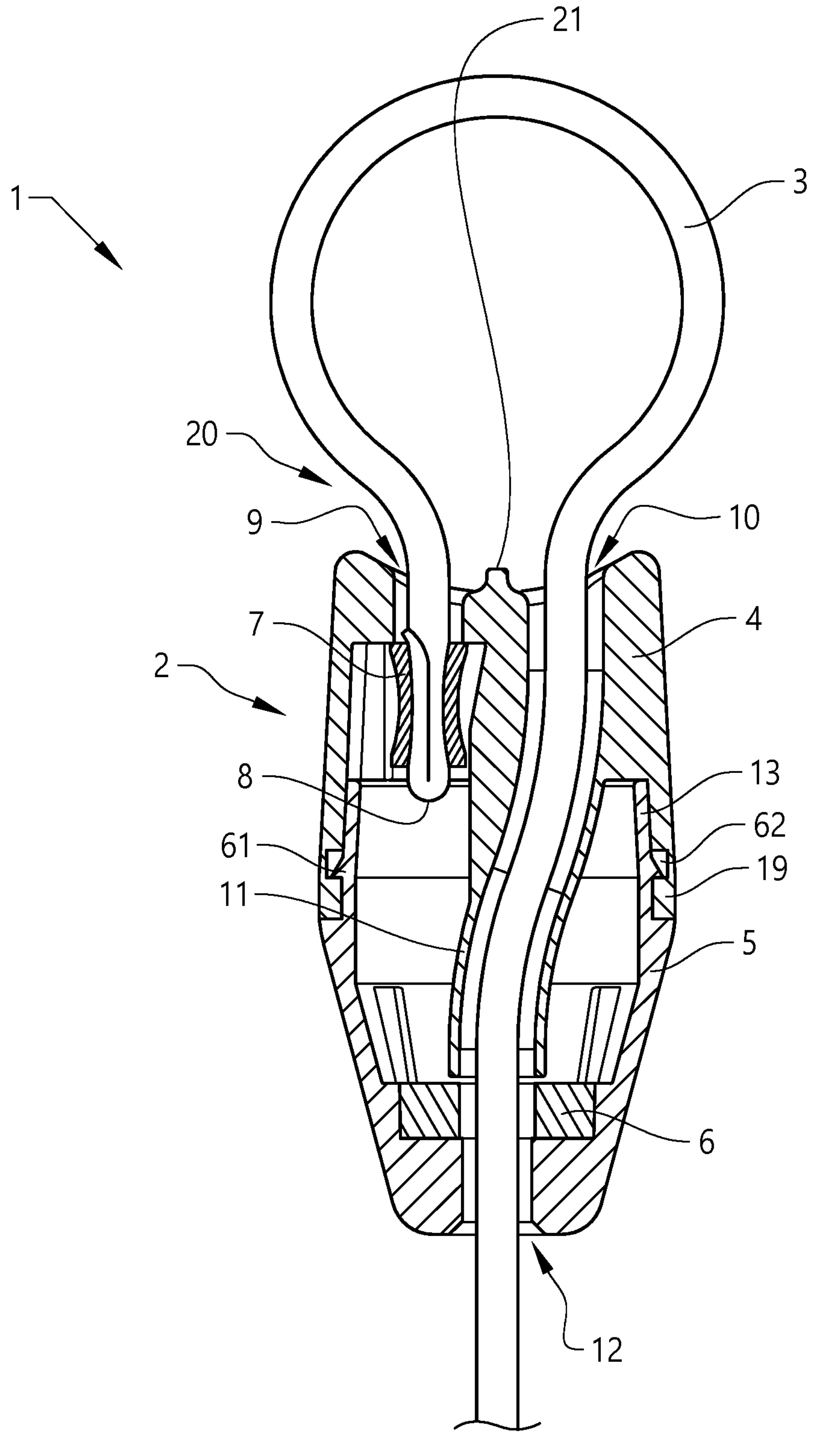
FIG. 6 shows a cross-sectional view of a holder element with a pulling wire arranged therein.

As shown in FIG. 6, the holder element 2 is provided with a wire guiding channel between the second and third apertures 10, 12 through which the pulling wire 3 runs. A part of the wire guiding channel is formed by a guiding tube 11 that is connected to the first portion 4 and extends towards the second portion 5.

The magnet 6 arranged in the holder element 2 is provided with a through hole through which the pulling wire 3 runs. The through hole forms part of the wire guiding channel. The magnet 6 is arranged at an inside of the second portion 5 in a recess facing the first portion 4 of the holder element 2. The guiding tube 11 is adapted to hold the magnet 6 in place when the first and second portions 4, 5 are interconnected.

When connecting to the knob, the loop is first arranged in an enlarged configuration with a diameter larger than the knob. The loop is thereafter arranged around the knob with the sheet in between the loop and the knob. The loop is thereafter tightened by pulling the wire away from the holder element and the knob. This reduces the diameter of the loop and locks the holder arrangement in place with respect to the sheet and the knob.

Figure 13:
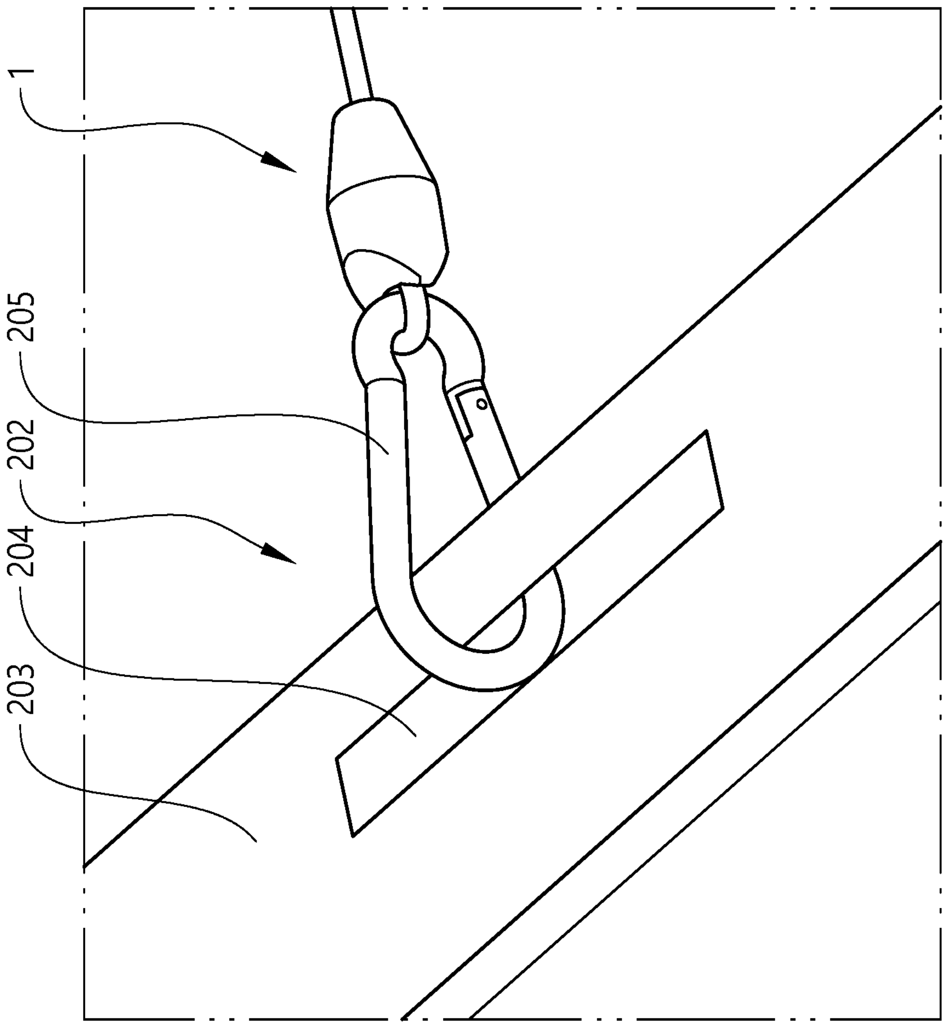
FIG. 13 shows a holder arrangement and a mattress member.

Similarly, when connecting to the carabineer, the loop is first arranged in an enlarged configuration so that the carabineer can be threaded through the loop. After the carabineer is threaded through the loop, the loop is tightened by pulling the wire away from the holder element and the carabineer. This reduces the diameter of the loop and locks the holder arrangement in place with respect to the carabineer. FIG. 13 shows a view of a holder arrangement attached to a carabineer, which in turn is attached to an opening of a mattress holder.

The first and the second portions 4, 5 may be connected in different ways. In the example holder arrangement demonstrated in FIGS. 6 and 7-8, the first portion 4 comprises a first rim 19 and the second portion 5 comprises a second rim 13. The second rim has a smaller circumference than the first rim, and the second portion may be press-fitted into the first portion. In the shown example, a snap-lock function is added. The respective rims may alternatively be threaded and the two portions can be screwed together. The two portions may also be held together by one or more screws, bolts, or similar. Preferably, the two portions are releasably attached to each other.

When the first 4 and the second 5 portions are interconnected, they encapsulate the stop arrangement 7. In other words, one or both portions enclose the stop arrangement. The stop arrangement is thereby enclosed by an internal volume defined by the first and/or the second portions.

An important aspect for any equipment used in a hospital environment or similar is cleanliness. The disclosed holder arrangement 1 comprises few simple parts that are easy to manufacture and easy to clean. The stop arrangement 7 may be a place where dirt accumulates. In addition, it may be difficult to clean the stop arrangement. The encapsulation of the stop arrangement therefore makes the disclosed holder arrangement easy to clean.

Any of the first 9, second 10, and third 12 apertures may be dimensioned such that the pulling wire 3 fits snugly in the apertures. For example, a diameter of an aperture may be 10% larger than a diameter of the pulling wire. This way, the amount of dirt entering the inside of the holder element 2 is reduced. Optionally, one or more of the apertures comprise a gasket or seal that further seals any space around the pulling wire to the inner surface of aperture. Such seal may be a brush seal. Furthermore, the first aperture may be configured such that the pulling wire has a snugger fit in that aperture compared to the other apertures since the first end 8 of the pulling wire is held in place with respect to the first aperture 9. The second 10 and third 12 apertures are preferably configured such that the pulling wire can run relatively unhindered through the apertures such that the loop can be made larger and smaller.

The holder element 2 preferably has a rounded shape. This way, less dirt can be accumulated on the holder element. The rounded shape further reduces deterioration of surfaces the holder element slides across, such as surrounding mattresses, sheets, and plastic material. In the example holder element in FIG. 3, the first portion 4 and the second portions have respective frustoconical shapes extending in the extension direction of the pulling wire 3 from the third aperture 12. In addition, the holder element 2 preferably has rounded shape to provide low friction when the holder element slides across a surface. Furthermore, the first portion may comprise flat portions 23, as is demonstrated in the example of FIG. 7*b*, which also provide low friction. These flat portions are arranged at an angle relative to an extension direction of the pulling wire from the third aperture.

The patient transfer device 101 disclosed herein may comprise a pulling arrangement 107 provided with a receiver member (not shown) configured to receive the holder element 2, wherein the receiver member has a complementary shape to the second portion 5 of the holder element 2. In FIG. 1, respective receiver members could be positioned on the casing 104 in connection to the wire bobbins 108. The proximity sensors 51, 52 may be arranged in association with such receiver members.

Figure 7A:
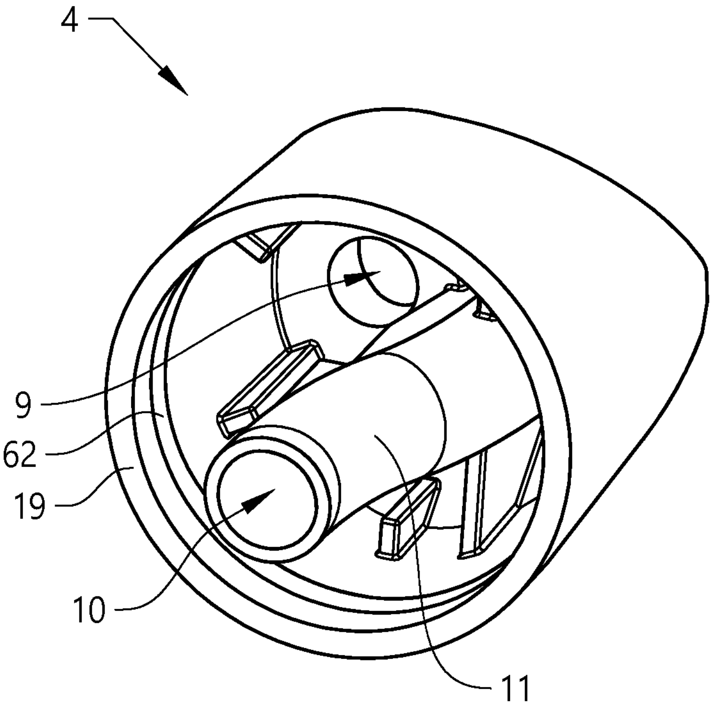
FIGS. 7*a* and 7*b* show different views of a first portion of a holder element.
Figure 7B:
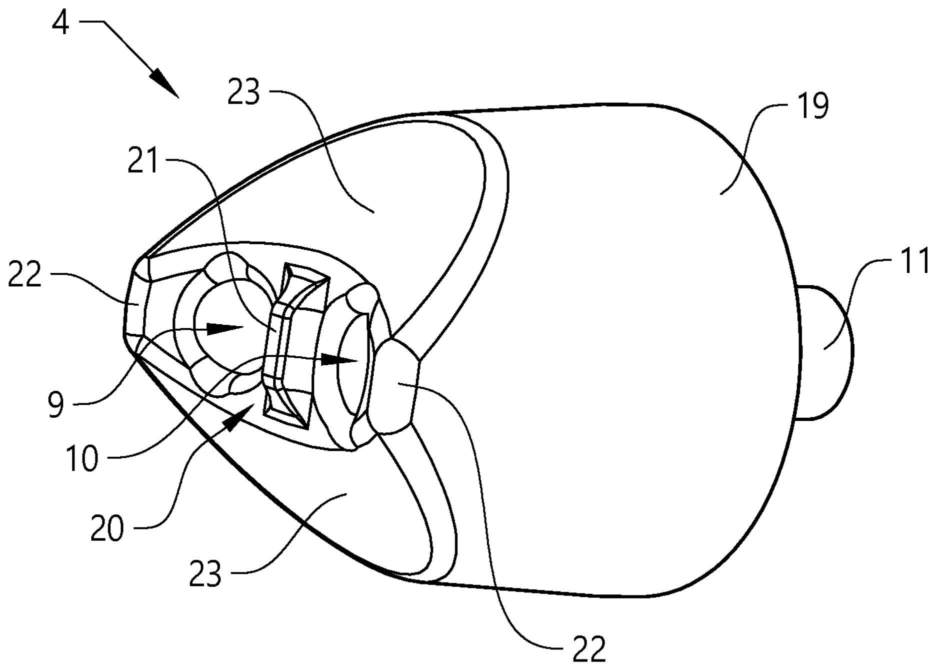
Figure 8A:
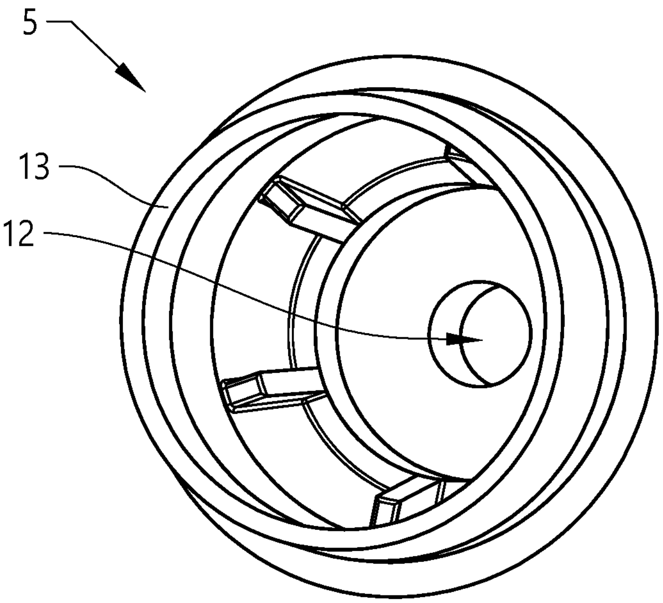
FIGS. 8*a* and 8*b* show different views of a second portion of a holder element.
Figure 8B:
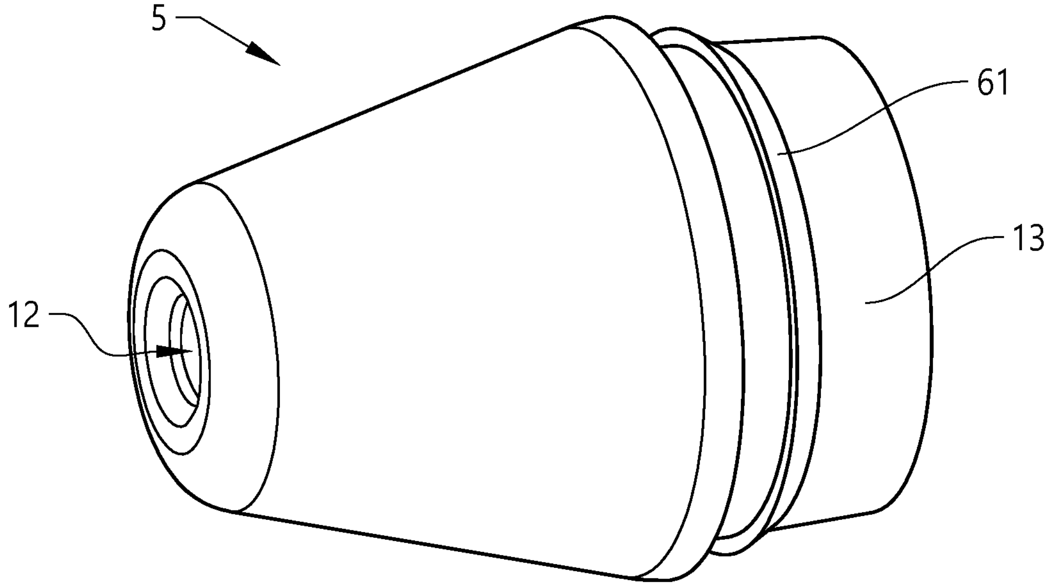

As is shown in FIG. 7*b*, the first portion 4 of the holder arrangement 2 may be provided with a front surface 20 on which the first and the second apertures 9, 10 are arranged. The pulling wire may bear on the front surface when the loop is in a smallest configuration, i.e., when the pulling wire is maximally retracted from the holder element without being connected to the knob. In some cases, there may be a very small gap between the front surface and the pulling wire. In any case, it may be difficult for an operator of the holder arrangement to grab the pulling wire for increasing the size of the loop before it is connected with the knob or carabineer. Therefore, as is shown in FIG. 7*b*, the first surface may be provided with a protrusion 21 arranged between the first and the second apertures and arranged extending from the first surface. The protrusion is configured to provide a (larger) gap between the pulling wire and the front surface when the loop is in said smallest configuration. The protrusion thus facilitates grabbing the pulling wire and thereby facilitates using the holder arrangement. The protrusion may e.g. have an extension length that is 0.2 to 2 times the diameter of the pulling wire.

The front surface may be arranged to bear on the knob with the sheet positioned between the knob and the front surface. In other words, the front surface may be arranged to abut the knob with the sheet positioned between the knob and the front surface. The front surface may similarly be arranged to bear on the carabineer. Thus, the front surface preferably has a shape complementary to the corresponding surface of the knob that it may abut and/or to the corresponding surface of the carabineer that it may abut. This further secures the holder arrangement to the carabineer or to the knob with the sheet positioned between the knob and the front surface. In particular, the front surface 20 may be semi-circular. FIG. 7*b* shows an example of a semi-circular front surface 20 between the ends 22. In addition, or alternatively, the front surface 20 may have a rounded bulging surface configured to interface a corresponding rounded shape of a knob groove 18 of a stem 16 of the knob 14. In other words, an inner edge of the front surface section is rounded and convex.

Figure 2:
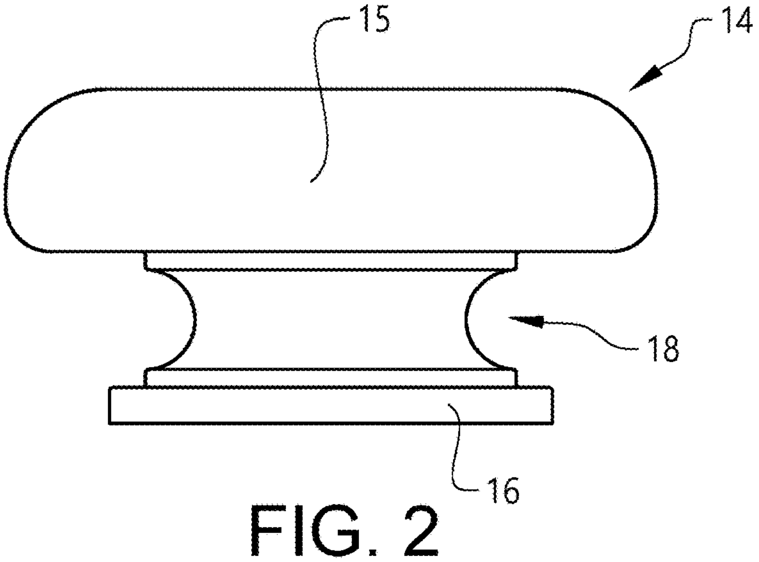
FIG. 2 shows a knob.

FIG. 2 shows an example of a knob 14. The knobs in the example sheet members in any of the figures herein may be the example knob of FIG. 2. In FIG. 2, the knob is provided with a head 15 and a stem 16. The stem has a circular cross section and the head 15 is larger than the stem 16. The stem is provided with a circumferential rounded knob groove 18. The groove is concave and is adapted to cooperate with the loop of the holder arrangement. The height of the groove 18 equals in one example the diameter of the pulling wire. However, the height is preferably slightly larger than the diameter, such as at least 10% larger, and more preferably 20% larger. The sheet may thereby be clamped between the groove and the loop in a secure manner with a tight fit. There is a relatively large contact surface between the sheet and the holder arrangement, which reduces the risk of the sheet slipping or ripping during the transfer of a patient from one surface to another surface. Furthermore, the diameter of the groove preferably is larger than three times the diameter of the pulling wire. This allows a sheet to be clamped between the loop and the groove in a secure and tight manner, which will reduce the contact load on the sheet. In the example of FIGS. 3-7*b*, the pulling wire has a diameter of 3 mm and the groove 18 has a height of 6 mm.

The size of the wire loop of the holder arrangement is reconfigurable, which provides flexibility since the holder arrangement may be used for differently sized knobs without modification. In addition, the sheet will most likely not be folded evenly over the knob when it is attached to the holder arrangement. The holder arrangement may therefore be used to hold sheets of different materials and thicknesses, which may fold differently and thereby provide different effective diameters of the combination of knob and sheet.

The knob is preferably made in a stiff material, such as a reinforced plastic. The holder element 2 may also be made in a stiff material but is somewhat resilient, and may be made from an elastic plastic or rubber. It is of advantage if the holder element, the pulling wire, the sheet member and/or the mattress member is made from a material that is transparent to electromagnetic waves at frequency spans commonly used by machines in hospital equipment. Examples of such frequency spans are 10-500 kHz, 10-80 MHZ, and 80 MHz to 3 GHz. This gives low to zero disturbance of the applicability, interoperability, and output of radiating machines in hospital environments. In this way, the holder arrangement may not have to be removed when a patient is examined with radiation.

Figure 9A:
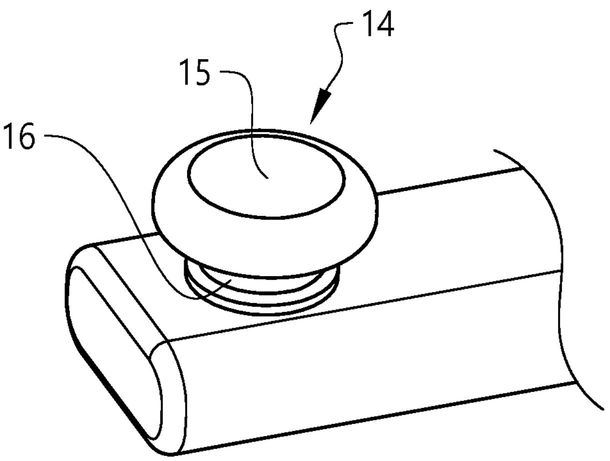
FIG. 9*a* shows a knob.
Figure 9B:
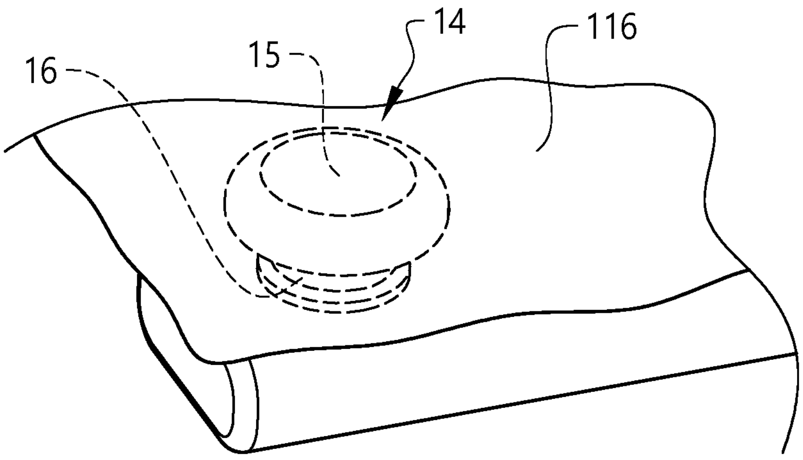
FIG. 9*b* shows a knob with a sheet.
Figure 9C:
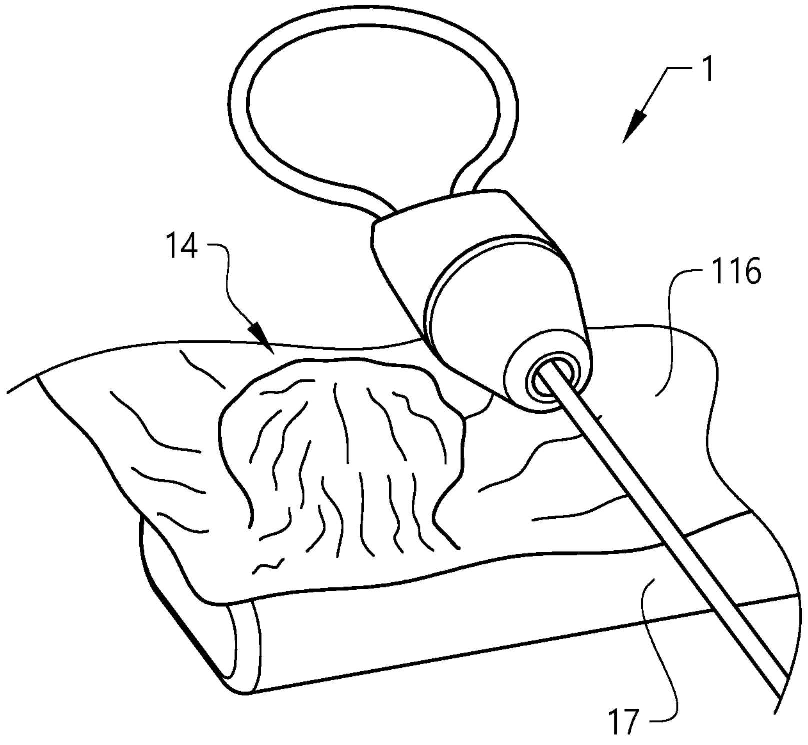
FIG. 9*c* shows a holder arrangement before being set in a locked state.
Figure 9D:
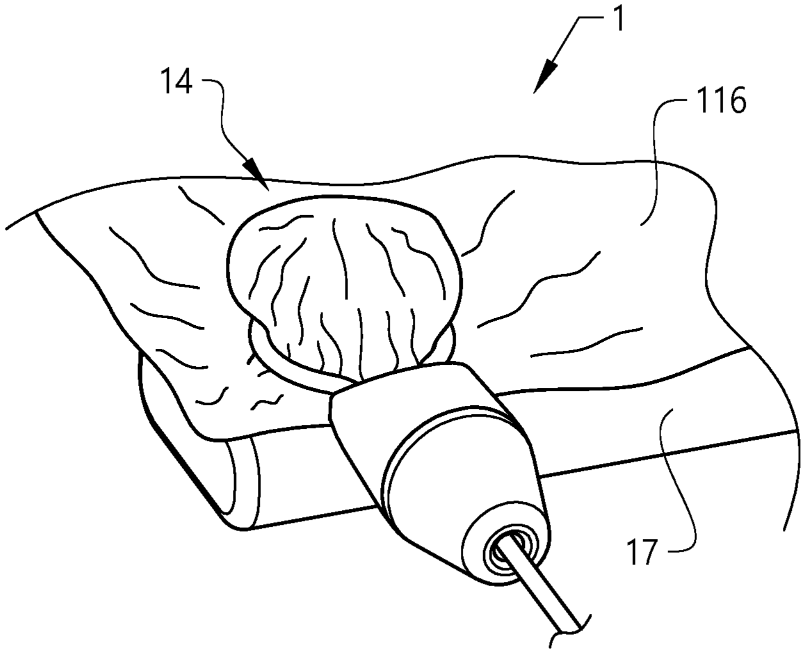
FIG. 9*d* shows a holder arrangement in a locked state.

FIGS. 9*a*-9*d* illustrate the attachment of a sheet to a holder arrangement where the sheet member 17 is a rod comprising at least one knob 14. FIG. 9*a* shows part of the sheet member with a knob. In FIG. 9*b*, a sheet 116 is placed on top of the knob 14 of the sheet member. In FIG. 9*c*, the holder arrangement is moved towards the knob with the sheet. Furthermore, the holder element is positioned above the knob and is pushed down with the loop extending over the head 15 of the knob. At this stage, the diameter of the loop is larger than the diameter of the head of the knob. The sheet will at the same time be pushed down over the knob and will be drawn together somewhat by the loop. In FIG. 9*d*, the knob and the holder arrangement is in a locked state. The second end of the pulling wire has been pulled away from the holder element 2 and the knob such that the loop is close to the groove 18, and such that the sheet is pressed and held between the loop and the groove in a tight manner.

Figure 14B:
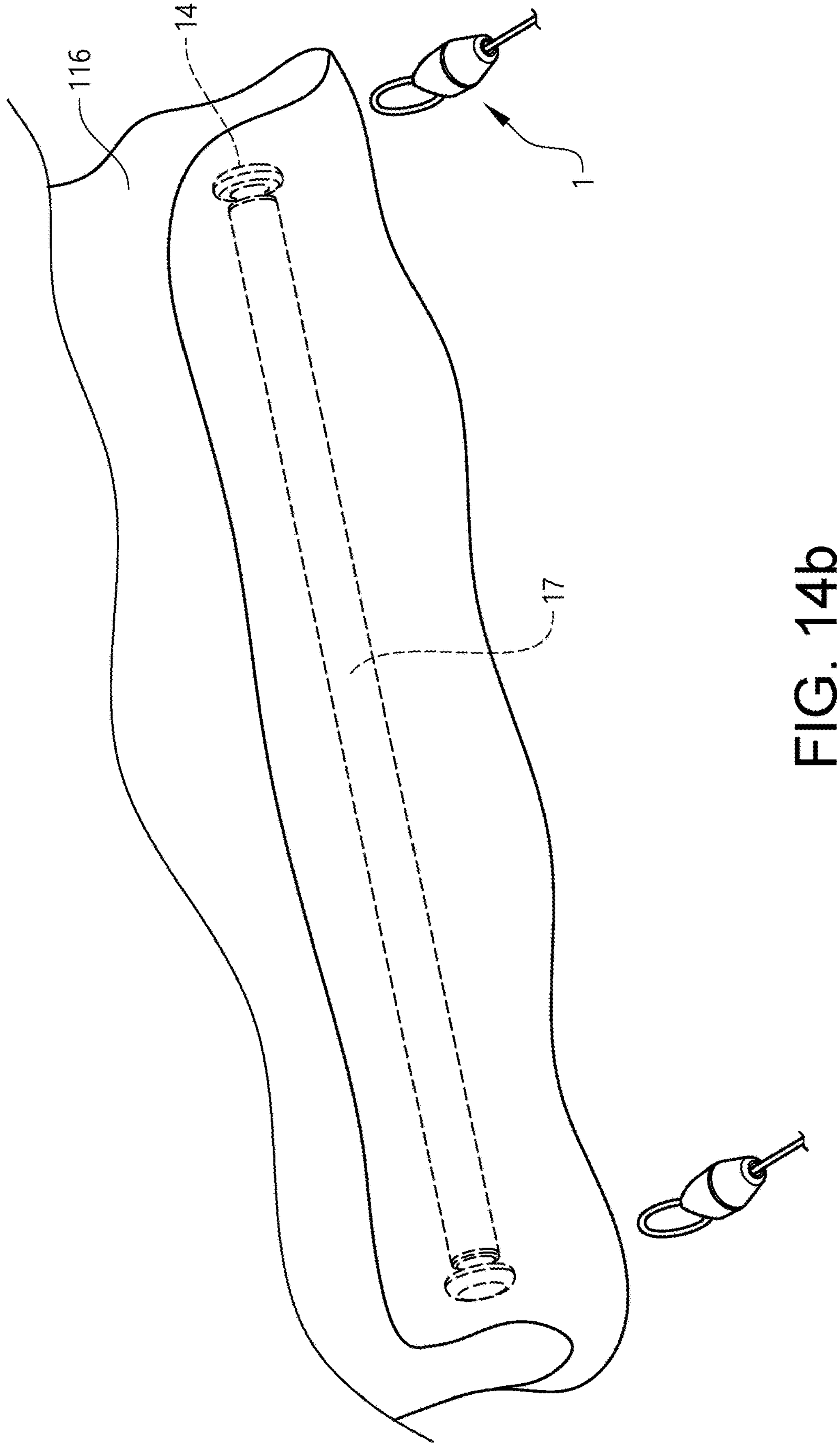
FIG. 14*b* shows a sheet member with a sheet.
Figure 14C:
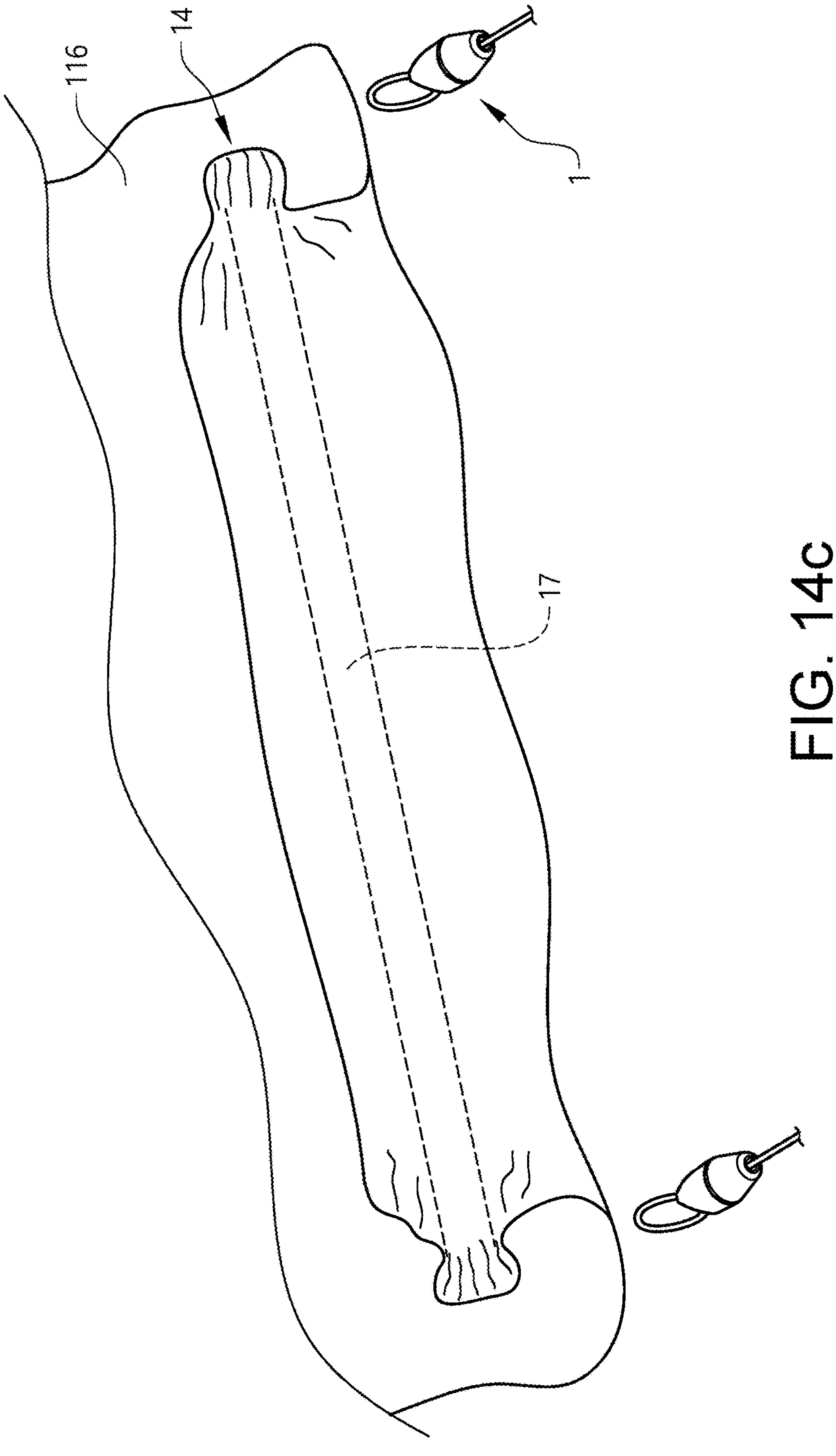
FIG. 14*c* shows a holder arrangement before being set in a locked state.
Figure 14D:
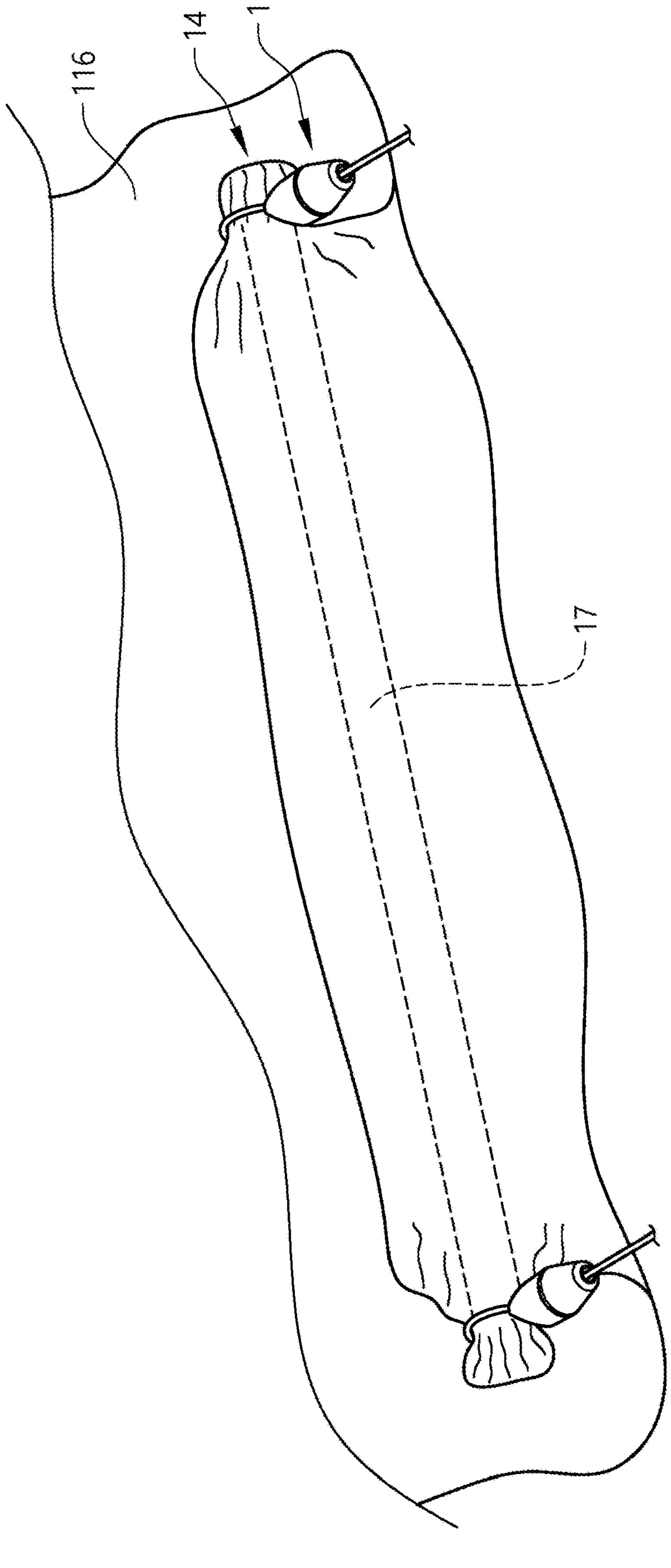
FIG. 14*d* shows a holder arrangement in a locked state.

FIGS. 14*a*-14*d* illustrate the attachment of a sheet to a holder arrangement where the sheet member 17 is an elongated member extending in an longitudinal direction, which comprises two knobs 14 arranged at a distance from each other in the longitudinal direction, where the knobs are arranged extending in the longitudinal direction. FIG. 14*a* shows the sheet member on top of a sheet. In FIG. 14*b*, the sheet 116 is folded over the knobs 14 of the sheet member. In FIG. 14*c*, respective holder arrangements are moved towards respective knobs with the sheet. Furthermore, each holder element is positioned next to a knob and is pushed on that knob with the loop extending over the head 15 of that knob. At this stage, the diameter of each loop is larger than the diameter of the head of the corresponding knob. In FIG. 14*d*, the each knob and corresponding holder arrangement is in a locked state. The second ends of each pulling wire has been pulled away from the corresponding holder elements 2 and knobs such that the respective loops are tightened, and such that the sheet is pressed and held between the respective loops and knobs in a tight manner.

There is also disclosed herein a system comprising the patient transfer device 101 according to above and the mattress member 202 arranged attachable to the mattress 201 and/or the sheet member 17.

Figure 15:
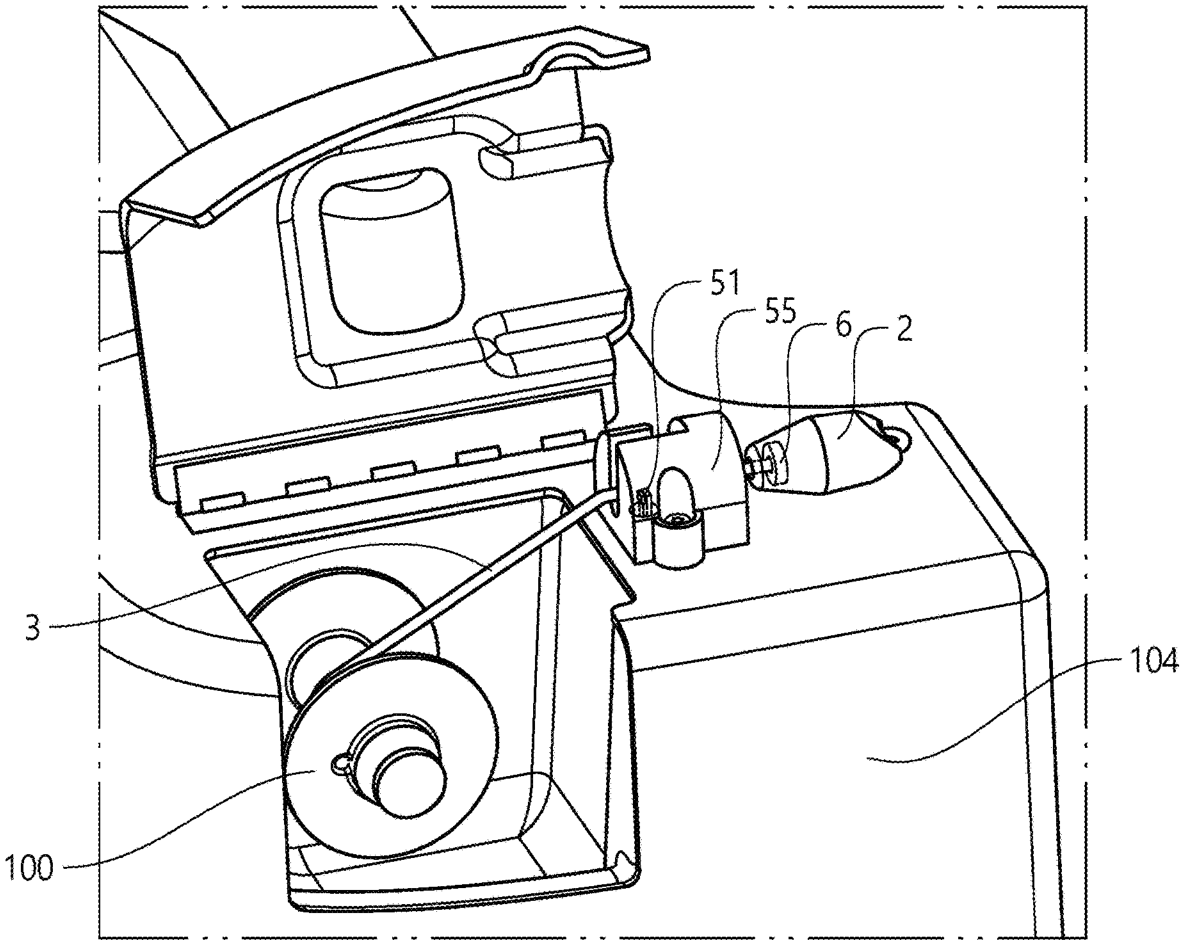
FIGS. 15-16 show an example on an arrangement of a proximity sensor of the patient transfer device.
Figure 16:
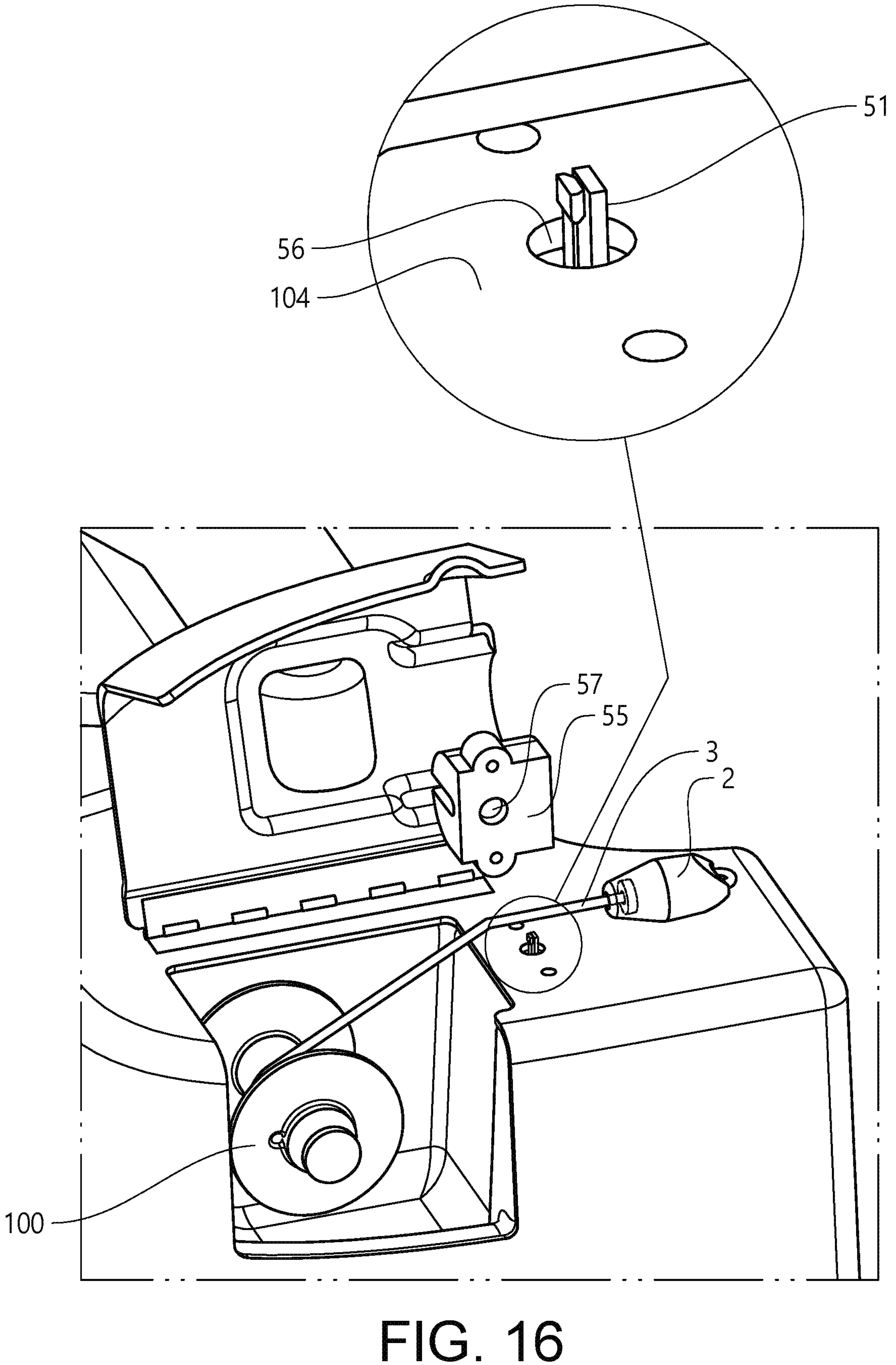

FIGS. 15-16 show an example on a more detailed level how to arrange one of the proximity sensors 51, 52 on the patient transfer device 101. The proximity sensor 51 is in this example a Hall effect sensor capable of detecting the magnet 6 arranged in the holder element 2 when the magnet 6 comes sufficiently close to the sensor 51. The sensor 51 is arranged at an edge of a circuit board (not shown) and protrudes through a hole 56 in the casing 104 so as to be positioned above, in this example 6 mm above, an upper surface of the casing 104.

On top of and around the proximity sensor 51 there is a wire guide 55 arranged, which also acts as a receiver for the holder element 2. The wire guide 55 is open towards the holder element 2 and has a shape adapted to that of the holder element 2 so as to receive and enclose a part of the holder element 2. A recess 57 for housing the sensor 51 is provided on a lower side of the wire guide 55. The recess 57 has in this case a depth/height of 7 mm, and a sufficient diameter, to allow room for the upwardly protruding proximity sensor 51. The wire guide 55 is attached to the upper surface of the casing 104 by means of screws.

This arrangement allows the holder element 2, and thus the magnet 6, to come very close to the sensor 51 when it reaches its end position in the wire guide 55. In turn this provides for using a relatively small magnet 6 without risking that its location at the end position will not be sensed by the proximity sensor 51. And an effect of this is that it becomes possible to reduce the size of the holder element 2.

A sensor arrangement in line with what is shown in FIGS. 15-16 is suitable also for other types of sensors, such as when the sensor is capable of detecting a piece of iron arranged in the holder element 2.

REFERENCE SIGNS

1: Holder arrangement
2: Holder element
3: Pulling wire
4: First portion
5: Second portion
6: Magnet
7: Stop arrangement
8: First end
8': Second end
9: Aperture
10: Aperture
11: Guiding tube
12: Aperture
13: Rim
14: Knob
15: Head
16: Stem
17: Sheet member
18: Knob groove
19: Rim
20: Front surface
21: Protrusion
22: Ends
23: Sloped surface
51: First proximity sensor
52: Second proximity sensor
53: Control circuitry
55: Wire guide/receiver for holder element
56: Through hole in casing
57: Recess for proximity sensor
61: Flange
62: Groove
101: Patient transfer device
102: Frame
103: Motor
104: Casing
105: Wheel
106: Vertical track
107: Pulling arrangement
108: Bobbin
111: Arm
112: Wall
113: First surface
114: Receiving surface
115: Bed
116: Sheet
117: Patient
201: Mattress
202: Mattress member
203: Mattress holder
204: Opening
205: Carabineer

The invention claimed is:

1. A patient transfer device for transferring a patient placed on a sheet or a mattress from a first surface to a receiving surface, wherein the patient transfer device comprises:
at least one retractable pulling wire;
a pulling arrangement comprising a motor operatively connected to a pulling wire so as to allow retraction of the pulling wire by means of the motor;
a holder arrangement for holding the sheet or the mattress when moving the sheet or the mattress and thereby transferring the patient placed on the sheet or the mattress;
wherein the holder arrangement comprises a holder element to which a first end of the pulling wire is attached,
wherein the pulling arrangement is configured to retract the pulling wire and thus move the holder arrangement and the holder element towards the pulling arrangement so as to, when the holder arrangement is arranged to hold the sheet or the mattress, move the sheet or the mattress towards the pulling arrangement and thereby transfer the patient placed on the sheet or the mattress from the first surface to the receiving surface, wherein the pulling arrangement is provided with a proximity sensor configured to detect whether the holder element has reached an end position at or close to the pulling arrangement characterized in that the proximity sensor is configured to sense presence or changes in an electromagnetic field or a beam of electromagnetic radiation, that the holder arrangement comprises a stop arrangement configured to hold the first end of the pulling wire in place with respect to the holder element, and wherein the holder element encapsulates the stop arrangement, that the holder element is provided with first, second and third apertures, and wherein the stop arrangement is arranged inside the holder element at the first aperture, that the pulling wire extends out from the holder element via the first aperture and back into the holder element via the second aperture so as to form a loop outside of the holder element between the first and second apertures, that the pulling wire extends out from the holder element via the third aperture and further towards the pulling arrangement, that the pulling wire is free to move in relation to the holder element between the second and third apertures so that the loop of the wire is tightened or decreased when pulling the pulling wire out from the third aperture and so that the loop of the pulling wire is loosened or increased when pulling the pulling wire out from the second aperture, and in that the holder element comprises a magnet wherein the magnet is provided with a through hole through which the pulling wire runs.

2. The patient transfer device according to claim 1, wherein the patient transfer device is provided with a control circuitry configured to control operation of the motor in dependence of a sensor signal received from the proximity sensor, wherein the control circuitry is configured to stop operation of the motor when receiving the sensor signal that indicates that the holder element has reached the end position.

3. The patient transfer device according to claim 2, wherein the proximity sensor is configured to sense presence or changes in a magnetic field and wherein the holder element is provided with the magnet.

4. The patient transfer device according to claim 3, wherein the pulling arrangement comprises a wire bobbin connected to the motor and wherein the proximity sensor is arranged in connection to the wire bobbin.

5. The patient transfer device according to claim 1, wherein the proximity sensor is configured to sense presence or changes in the magnetic field, such as a Hall effect sensor, and wherein the holder element is provided with the magnet.

6. The patient transfer device according to claim 5, wherein the proximity sensor protrudes through a hole in a casing of the pulling arrangement so as to be positioned at least partly above an upper surface of the casing.

7. The patient transfer device according to claim 1, wherein the holder element comprises a first and a second portion, wherein the first and second apertures are arranged in the first portion, wherein the third aperture is arranged in the second portion, and wherein the first portion is arranged to interconnect with the second portion so that the first and/or the second portion encapsulate the stop arrangement when connected.

8. The patient transfer device according to claim 7, wherein the first and second portions of the holder element are arranged so that a part of one of the portions is inserted into the other portion when the first and second portions are pushed together and connected so as to form the holder element, and wherein the first and second portions are provided with a pair of complementary and circumferentially extending snap-lock members that engage when the first and second portions are pushed together and connected.

9. The patient transfer device according to claim 8, wherein the complementary and circumferentially extending snap-lock members comprises a flange and a groove, wherein the flange has an inclined side directed so as to facilitate passage of the snap-lock members when pushing the first and second portions together, and wherein the flange has a straight side directed in an opposite direction so as to prevent unintentional passage of the snap-lock members when the first and second portions have been pushed together and connected.

10. The patient transfer device according to claim 7, wherein the holder element is provided with a wire guiding channel through which the pulling wire runs, wherein the wire guiding channel extends between the second and third apertures, and wherein a part of the wire guiding channel is formed by a guiding tube that is connected to the first portion and extends towards the second portion.

11. The patient transfer device according to claim 10, wherein the magnet is arranged at an inside of the second portion facing the first portion of the holder element, wherein the guiding tube is adapted to hold the magnet in place when the first and second portions are interconnected.

12. The patient transfer device according to claim 1, wherein the stop arrangement comprises a knot formed by the pulling wire and/or a stop member attached to the pulling wire.

13. The patient transfer device according to claim 1, wherein the stop arrangement comprises a ferrule arranged around the pulling wire, wherein the ferrule is clamped onto the pulling wire so as to be firmly attached thereto, and wherein the ferrule, at least over a part of its length, has a diameter that is larger than that of the first aperture.

14. The patient transfer device according to claim 1, wherein the holder element is made of a polymer material.

15. The patient transfer device according to claim 1, wherein the pulling arrangement comprises a wire bobbin connected to the motor and wherein the proximity sensor is arranged in connection to the wire bobbin.

16. The patient transfer device according to claim 1, wherein the proximity sensor protrudes through a hole in a casing of the pulling arrangement so as to be positioned at least partly above an upper surface of the casing.

17. The patient transfer device according to claim 16, wherein a component is arranged on top of and around the proximity sensor, wherein the component on its lower side is provided with a recess configured to give room for and house the protruding part of the proximity sensor.

18. The patient transfer device according to claim 17, wherein the component is a wire guide and/or a receiver for the holder element.

19. A patient transfer device for transferring a patient placed on a sheet or a mattress from a first surface to a receiving surface, wherein the patient transfer device comprises:

at least one retractable pulling wire;

a pulling arrangement comprising a motor operatively connected to a pulling wire so as to allow retraction of the pulling wire by means of the motor;

a holder arrangement for holding the sheet or the mattress when moving the sheet or the mattress and thereby transferring the patient placed on the sheet or the mattress;

wherein the holder arrangement comprises a holder element to which a first end of the pulling wire is attached, wherein the pulling arrangement is configured to retract the pulling wire and thus move the holder arrangement and the holder element towards the pulling arrangement so as to, when the holder arrangement is arranged to hold the sheet or the mattress, move the sheet or the mattress towards the pulling arrangement and thereby transfer the patient placed on the sheet or the mattress from the first surface to the receiving surface, wherein the pulling arrangement is provided with a proximity sensor configured to detect whether the holder element has reached an end position at or close to the pulling arrangement characterized in that the proximity sensor is configured to sense presence or changes in an electromagnetic field or a beam of electromagnetic radiation, that the holder arrangement comprises a stop arrangement configured to hold the first end of the pulling wire in place with respect to the holder element, and wherein the holder element encapsulates the stop arrangement, that the holder element is provided with first, second and third apertures, and wherein the stop arrangement is arranged inside the holder element at the first aperture, the holder element comprises a first and a second portion, wherein the first and second apertures are arranged in the first portion, wherein the third aperture is arranged in the second portion, and wherein the first portion is arranged to interconnect with the second portion so that the first and/or the second portion encapsulate the stop arrangement when connected, that the pulling wire extends out from the holder element via the first aperture and back into the holder element via the second aperture so as to form a loop outside of the holder element between the first and second apertures, that the pulling wire extends out from the holder element via the third aperture and further towards the pulling arrangement, that the pulling wire is free to move in relation to the holder element between the second and third apertures so that the loop of the wire is tightened or decreased when pulling the pulling wire out from the third aperture and so that the loop of the pulling wire is loosened or increased when pulling the pulling wire out from the second aperture, and in that the holder element comprises a magnet or a piece of iron.

20. The patient transfer device according to claim 19, wherein the first and second portions of the holder element are arranged so that a part of one of the portions is inserted into the other portion when the first and second portions are pushed together and connected so as to form the holder element, and wherein the first and second portions are provided with a pair of complementary and circumferentially extending snap-lock members that engage when the first and second portions are pushed together and connected.

21. The patient transfer device according to claim 20, wherein the complementary and circumferentially extending snap-lock members comprises a flange and a groove, wherein the flange has an inclined side directed so as to facilitate passage of the snap-lock members when pushing the first and second portions together, and wherein the flange has a straight side directed in an opposite direction so as to prevent unintentional passage of the snap-lock members when the first and second portions have been pushed together and connected.

22. The patient transfer device according to claim 19, wherein the holder element is provided with a wire guiding channel through which the pulling wire runs, wherein the wire guiding channel extends between the second and third apertures, and wherein a part of the wire guiding channel is formed by a guiding tube that is connected to the first portion and extends towards the second portion.

23. The patient transfer device according to claim 22, wherein the magnet is arranged at an inside of the second portion facing the first portion of the holder element, wherein the guiding tube is adapted to hold the magnet in place when the first and second portions are interconnected.

* * * * *